US012589401B2

(12) United States Patent
Zhu et al.

(10) Patent No.: US 12,589,401 B2
(45) Date of Patent: Mar. 31, 2026

(54) DISPENSER ASSEMBLY

(71) Applicant: KAO CORPORATION, Tokyo (JP)

(72) Inventors: Yanbo Zhu, Cincinnati, OH (US); Laura Knoll Price, Cincinnati, OH (US); Grace Elizabeth Weber, Cincinnati, OH (US)

(73) Assignee: KAO CORPORATION, Tokyo (JP)

( * ) Notice: Subject to any disclaimer, the term of this patent is extended or adjusted under 35 U.S.C. 154(b) by 186 days.

(21) Appl. No.: 18/534,254

(22) Filed: Dec. 8, 2023

(65) Prior Publication Data

US 2024/0189847 A1 Jun. 13, 2024

Related U.S. Application Data

(60) Provisional application No. 63/386,577, filed on Dec. 8, 2022.

(51) Int. Cl.
*B05B 11/00* (2023.01)
*B05B 11/10* (2023.01)

(52) U.S. Cl.
CPC ...... *B05B 11/1001* (2023.01); *B05B 11/0037* (2013.01); *B05B 11/1073* (2023.01)

(58) Field of Classification Search
CPC ............. B05B 11/1001; B05B 11/0037; B05B 11/1073
See application file for complete search history.

(56) References Cited

U.S. PATENT DOCUMENTS

| | | | |
|---|---|---|---|
| 6,415,939 B1 | 7/2002 | Redmond |
| 8,033,433 B2 | 10/2011 | Gibson et al. |
| 8,998,939 B2 | 4/2015 | Price et al. |
| 2007/0257069 A1 | 11/2007 | Gibson et al. |
| 2023/0278852 A1 | 9/2023 | Lalier et al. |

FOREIGN PATENT DOCUMENTS

| | | |
|---|---|---|
| JP | 2007-522047 A | 8/2007 |
| JP | 2021-095197 A | 6/2021 |
| JP | 2023-536303 A | 8/2023 |

*Primary Examiner* — Vishal Pancholi
(74) *Attorney, Agent, or Firm* — Oblon, McClelland, Maier & Neustadt, L.L.P.

(57) ABSTRACT

An assembly includes: an attachment; and a container. The container includes a main body and a tube section, the main body forming a storage space, the tube section having an opening that communicates with the storage space, the tube section having an outer circumference surface provided with a first engagement section, the first engagement section having a first surface facing a first direction that is a direction toward the storage space. The attachment includes a ring-shaped section that is fittable with the tube section, the ring-shaped section having an inner circumference surface provided with a second engagement section, the second engagement section having a first surface facing a second direction away from the storage space, the first engagement section and the second engagement section being engageable with each other when the first surface of the first engagement section abuts the first surface of the second engagement section.

20 Claims, 28 Drawing Sheets

DISPENSER ASSEMBLY

CROSS-REFERENCE TO RELATED APPLICATION

This application is based on and claims the benefit of and priority to U.S. Provisional Patent Application No. 63/386,577, entitled "CONTAINER", filed on Dec. 8, 2022, the entire contents of which are herein incorporated by reference.

TECHNICAL FIELD

The present invention relates to a dispenser assembly.

BACKGROUND ART

In recent years, containers that store fluid, and discharge it in response to operations performed by users have been widespread. A certain type of the container includes a nozzle with a discharge outlet, and a pump that sucks and pumps the fluid. When the nozzle is pressed against a body part of the user, the pressing of the nozzle causes the pump to pump the fluid into the discharge outlet and discharge the fluid from the discharge outlet toward the body part of the user.

With regard to the discharge of fluid, Patent Literature 1 discloses a discharge container having a nozzle with a discharge outlet whose shape or arrangement position is modified. By modifying the shape or arrangement position of the discharge outlet, it is possible to shape the fluid discharged toward the body part of the user into a predetermined desired shape such as an animal, plant, or character. In addition, Patent Literature 2 and Patent Literature 3 disclose configurations related to a container or other things. In addition, Patent Literature 4 and Patent Literature 5 disclose modification to configurations related to installation of an attachment such as an adapter or cap for a container.

Citation List

Patent Literature

| | |
|---|---|
| Patent Literature 1: | JP 2021-95197A |
| Patent Literature 2: | U.S. Pat. No. 6,415,939B |
| Patent Literature 3: | U.S. Pat. No. 8,998,939B |
| Patent Literature 4: | JP 2007-522047A |
| Patent Literature 5: | JP 2023-536303A |

DISCLOSURE OF INVENTION

Technical Problem

However, with regard to the configurations disclosed in Patent Literature 4 and Patent Literature 5, there is a room for improvement in attachability/detachability of the attachment.

The present invention relates to an assembly including an attachment with improved attachability/detachability.

Solution to Problem

To solve the above-described problem, an aspect of the present invention relates to an assembly including an attachment and a container, the container including a main body and a tube section, the main body forming a storage space, the tube section having an opening that communicates with the storage space, the tube section having an outer circumference surface provided with a first engagement section, the first engagement section having a first surface facing a first direction that is a direction toward the storage space, the attachment including a ring-shaped section that is fittable with the tube section, the ring-shaped section having an inner circumference surface provided with a second engagement section, the second engagement section having a first surface facing a second direction that is a direction away from the storage space, the first engagement section and the second engagement section being engageable with each other when the first surface of the first engagement section abuts on the first surface of the second engagement section, drag force in the second direction being larger than drag force in the first direction, the drag force being force for the first engagement section or the second engagement section to go over each other, the tube section including a first guide section and a curved portion protruding toward the first direction, the first guide section having a first surface facing the second direction, the ring-shaped section including a second guide section and a curved portion protruding toward the first direction, the second guide section having a first surface facing the first direction, the first surface of the first engagement section extending along a first rotation direction in such a manner that the first surface gets biased toward the second direction as the first surface goes toward the first rotation direction, the first rotation direction being one of circumferential directions of the tube section, at least one of the first surface of the first guide section or the first surface of the second guide section extending along the first rotation direction in such a manner that the first surface gets biased toward the second direction as the first surface goes toward the first rotation direction, the first surface of the second engagement section being provided in such a manner that the first surface of the second engagement section abuts on the first surface of the first engagement section or separates from the first surface of the first engagement section toward the first direction in a state where the first surface of the first guide section abuts on the first surface of the second guide section.

MODE(S) FOR CARRYING OUT THE INVENTION

Hereinafter, referring to the appended drawings, preferable embodiments of the present invention will be described in detail. Note that, in this specification and the appended drawings, structural elements that have substantially the same function and structure are denoted with the same reference signs, and repeated explanation of these structural elements will be omitted.

<Schematic configuration of Apparatus>

In recent years, containers that store fluid and discharge it in response to operations performed by users have been widespread. Examples of a discharge receiver serving as a discharge destination into which the fluid is discharged includes a body part such as a hand or an arm of a user, a sponge for cleaning or embrocation, a food such as bread on which cream or the like is to be spread, and the like. Next, a schematic configuration of a container 10 according to an embodiment of the present invention will be described with reference to FIG. 1 and FIG. 2.

Figure 1:
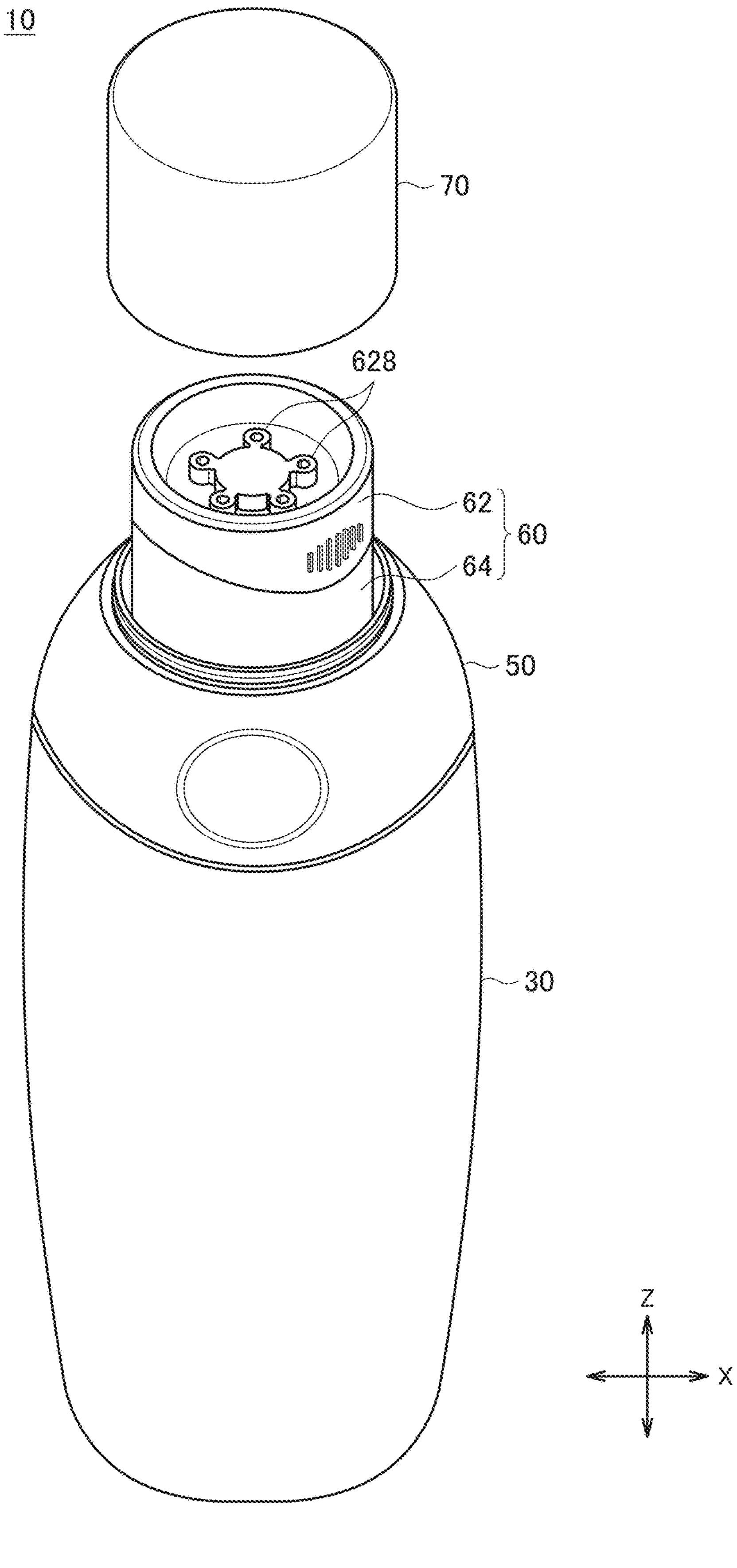
FIG. 1 is a perspective view of a container 10 according to an embodiment of the present invention.
Figure 2:
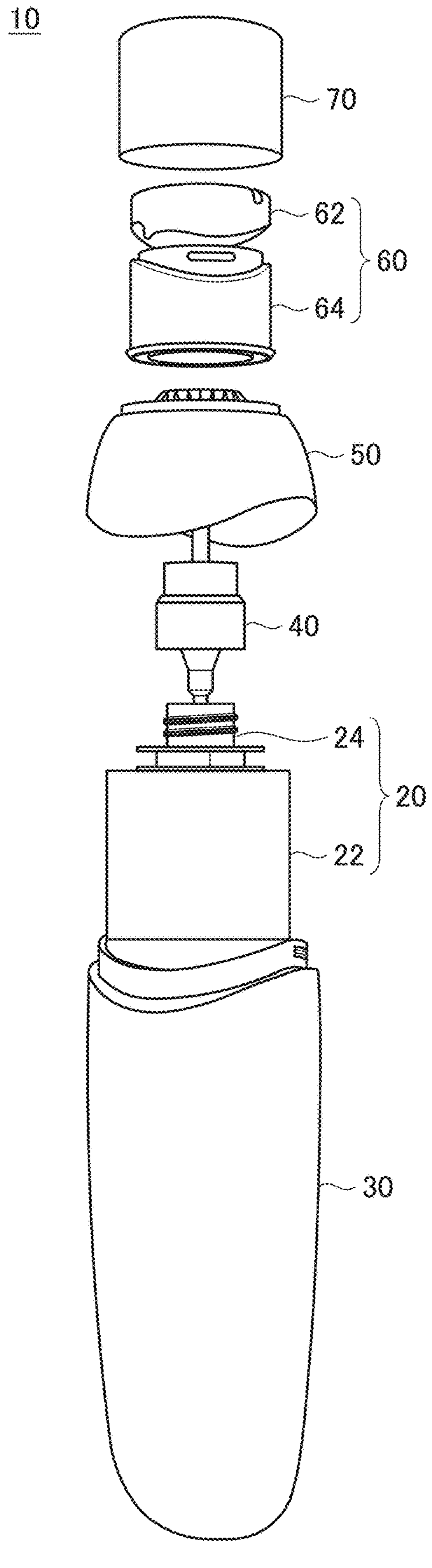
FIG. 2 is an exploded perspective view of the container 10 according to the embodiment of the present invention.

FIG. 1 is a perspective view of the container 10 according to the embodiment of the present invention. FIG. 2 is an exploded perspective view of the container 10 according to the embodiment of the present invention. As illustrated in FIG. 1 and FIG. 2, the container 10 according to the embodiment of the present invention includes a bag container 20, an exterior container 30, a pump section 40, a shoulder section 50, a discharge section 60, and an overcap 70.

(Bag Container 20)

The bag container 20 forms a storage space that stores fluid. The fluid stored in the bag container 20 may be liquid, gel, or paste. All of the liquid, gel, and paste are flowable, but the liquid does not have a permanent fixed shape, and the gel and paste are semisolid and may have temporary fixed shapes. Specifically, examples of the fluid stored in the bag container 20 include liquid detergent, fabric softener, bleach, shampoo, hair conditioner, hair treatment, body soap, cosmetic liquid, body cream, drug, toilet gel stamp, hair cosmetic, various kinds of foods (for example, edible oil and fat such as mayonnaise and margarine, cream, and the like.

As illustrated in FIG. 2, the bag container 20 includes a bag main body 22 and a spout section 24. The bag main body 22 is a soft package and may include a plurality of sheets that are bonded together, for example. A space enclosed by the plurality of sheets is a storage space for the fluid. The spout section 24 is fixed to the bag main body 22 when the spout section 24 is joined to an inner circumference surface of the bag main body 22. The spout section 24 has an opening that connects to the storage space for the fluid. Note that, examples of the plurality of sheets include a monolayer or multilayer film or a stacked sheet made of a synthetic resin such as a polyolefin, a polyester, or a polyamide, or a combination thereof, a stacked sheet obtained by adding a metal deposition layer made of aluminum to the monolayer or multilayer film or the stacked sheet described above, or the like. However, the plurality of sheets is not limited thereto. In addition, the bag main body 22 may have a non-circular shape when viewed in plan view. For example, the bag main body 22 may have a shape having a longitudinal direction and a lateral direction when viewed in plan view.

(Exterior Container 30)

The exterior container 30 stores the bag container 20 detachably. In the example illustrated in FIG. 1 and FIG. 2, the exterior container 30 has an oval shape when viewed in plan view. In this specification, sometimes the longitudinal direction (X-axis direction in FIG. 1) of the exterior container 30 may be referred to as a width direction when viewed in plan view. Note that, the exterior container 30 is preferably stiff enough not to be deformed by squeeze.

(Pump Section 40)

The pump section 40 is detachably attached to the bag container 20. For example, the pump section 40 is detachably attached to the bag container 20 when the pump section 40 is screwed into the spout section 24 of the bag container

20. The pump section 40 includes a piston. When the discharge section 60 is pressed against the discharge receiver (for example, a hand B of the user illustrated in FIG. 3), the discharge section 60 moves in a direction toward the storage space of the bag main body 22, and the piston of the pump section 40 also moves in the same direction in tandem with the movement of the discharge section 60. The pump section 40 pumps the fluid into the discharge section 60 while the piston moves in the direction toward the storage space of the bag main body 22.

When the press of the discharge section 60 against the discharge receiver is canceled, the piston of the pump section 40 and the discharge section 60 move in a direction away from the storage space of the bag main body 22 due to elastomeric force of a spring installed in the pump section 40. The pump section 40 sucks the fluid from the storage space of the bag main body 22 while the piston moves in the direction away from the storage space of the bag main body 22.

In this specification, sometimes a direction in which the piston of the pump section 40 gets closer to the storage space of the bag main body 22 may be referred to as a downward direction (first direction. Negative direction of the Z axis illustrated in FIG. 1), and a direction in which the piston of the pump section 40 gets away from the storage space of the bag main body 22 may be referred to as an upward direction (second direction. The other direction of the Z axis illustrated in FIG. 1) that is an opposite direction of the downward direction. Note that, the upward direction and the downward direction are mere directions defined for explanatory convenience. The upward direction and the downward direction are not limited to vertical directions when actually using the container 10. It is possible for the user to use the container 10 according to the embodiment of the present invention in various postures.

(Shoulder Section 50)

The shoulder section 50 stores the pump section 40 and engages with the exterior container 30 detachably. It is possible to replace the bag container 20 with a new bag container 20 by detaching the shoulder section 50 from the exterior container 30, extracting the bag container 20 from the exterior container 30, and detaching the pump section 40 from the bag container 20. For example, it is possible for the user to set the new bag container 20 by attaching the pump section 40 to the new bag container 20, storing the bag container 20 into the exterior container 30, and installing the shoulder section 50 on the exterior container 30.

(Discharge Section 60)

The discharge section 60 has a plurality of discharge outlets 628 that discharges the fluid. The discharge section 60 is separable into a nozzle 62 having the plurality of discharge outlets 628 and a nozzle attachment section 64 having a tubular shape. The nozzle 62 is installed on a top of the nozzle attachment section 64 and functions as a top for the discharge section 60. The nozzle attachment section 64 functions as a base of the discharge section 60 and is installed on the pump section 40 that is a member on the bag container 20 side. The bag container 20 is a main body of container. The shoulder section 50 has a ring-shaped groove on its upper surface, and the discharge section 60 is able to reciprocate along an up-down direction in the ring-shaped groove. Note that, the ring shape is a shape that surround a certain region. The ring shape may be a continuous shape or a discontinuous shape.

Figure 3:
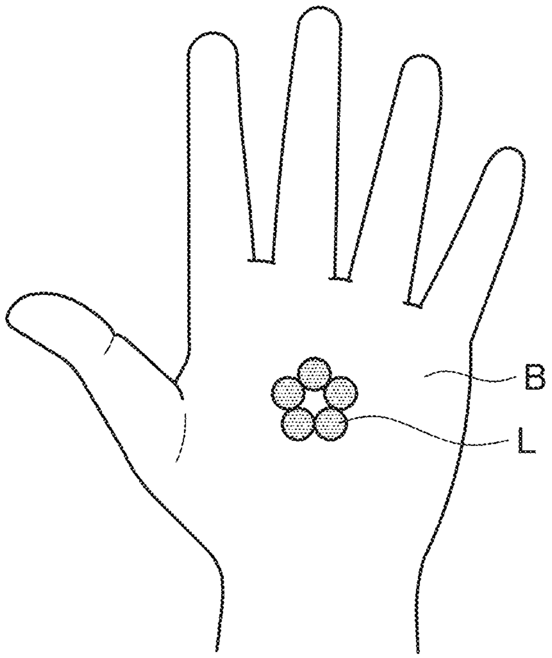
FIG. 3 is a specific example of fluid discharged onto a hand of a user.

The plurality of discharge outlets 628 are designed in such a manner that the fluid is shaped into a predetermined desired shape on the discharge receiver. The number, shape, and arrangement of the discharge outlets 628 are designed depending on the desired shape. In the example illustrated in FIG. 1, the five discharge outlets 628 are disposed on a circumference of a single circle at equal intervals. For example, when the discharge section 60 having the five discharge outlets is pressed against a hand of a user, the five discharge outlets 628 discharge the fluid and a flower-shaped fluid L is formed on a hand B of the user as illustrated in FIG. 3.

(Overcap 70)

The overcap 70 is detachably attached to the shoulder section 50. In a state where the overcap 70 is attached to the shoulder section 50, the discharge section 60 is not pressed against the discharge receiver. This makes it possible to prevent the discharge section 60 from discharging the fluid in a case where the user does not intend to do so.

The schematic configuration of the container 10 according to the embodiment of the present invention has been described above. Next, details of configurations of some elements included in the container 10 will be sequentially described.

<Configuration of Exterior Container 30>

Figure 4:
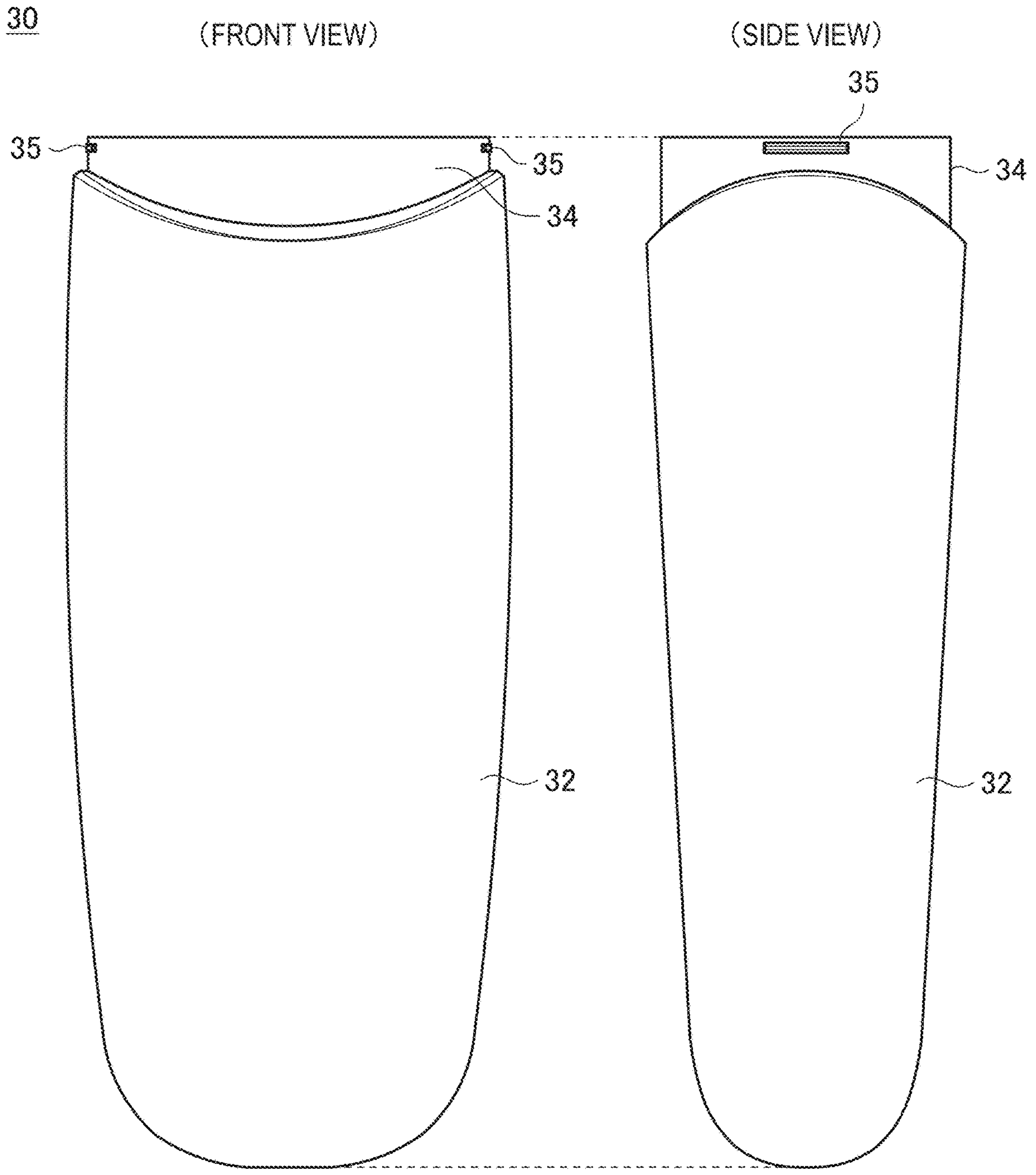
FIG. 4 is an explanatory diagram illustrating an external appearance of an exterior container 30 according to the embodiment of the present invention.

FIG. 4 is an explanatory diagram illustrating an external appearance of the exterior container 30 according to the embodiment of the present invention. FIG. 4 illustrates a front view and a side view of the exterior container 30. As illustrated in FIG. 4, the exterior container 30 includes a trunk section 32 and a smaller-diameter section 34.

The trunk section 32 has a tubular shape with a bottom. The smaller-diameter section 34 extends from an upper end of the trunk section 32 toward an upward direction. The smaller-diameter section 34 has a tubular shape, and has an outer diameter that is smaller than an outer diameter of the upper end of the trunk section 32. The smaller-diameter section 34 has an outer circumference surface provided with two ribs 35. In the example illustrated in FIG. 4, the two ribs 35 are formed at respective edges of the smaller-diameter section 34 in the width direction. Note that, FIG. 4 illustrates the example in which a borderline between the trunk section 32 and the smaller-diameter section 34 has a bump and a dip along the up-down direction. However, the borderline between the trunk section 32 and the smaller-diameter section 34 does not have to have the bump and dip along the up-down direction.

<Configuration of Spout Section 24>

The configuration of the exterior container 30 according to the embodiment of the present invention has been described above. Next, a configuration of the spout section 24 according to the embodiment of the present invention will be described.

Figure 5:
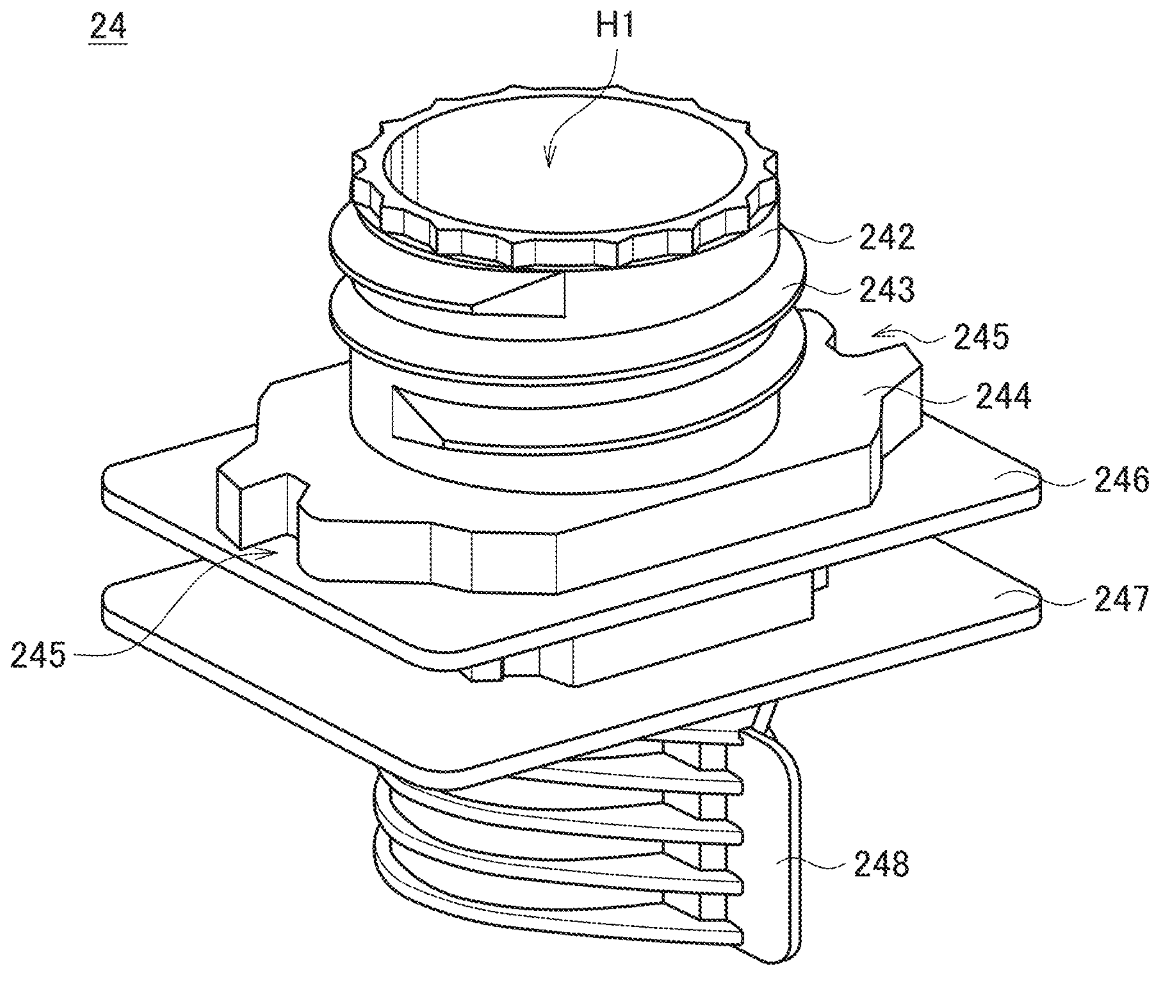
FIG. 5 is an explanatory diagram illustrating an external appearance of a spout section 24 according to the embodiment of the present invention.

FIG. 5 is an explanatory diagram illustrating an external appearance of the spout section 24 according to the embodiment of the present invention. As illustrated in FIG. 5, the spout section 24 includes a tube section 242, a protrusion section 244, an upper flange 246, a lower flange 247, and a joint section 248.

The tube section 242 has a tubular shape and has a pair of opposing openings. An opening H1 illustrated in FIG. 5 is an upper opening among the pair of openings of the tube section 242. The opening H1 communicates with the storage space for the fluid. The tube section 242 has an outer circumference surface provided with a screw section 243. When the bag containers 20 are individually sold, the opening H1 is closed by detachably attaching a cap that is screwed into the screw section 243.

The protrusion section 244 is a portion that protrudes from the outer circumference of the tube section 242. The outer circumference surface of the protrusion section 244 has two recess sections 245 that are hollowed in its radial direction.

The upper flange 246 and the lower flange 247 are also portions that protrude from the outer circumference of the tube section 242. The upper flange 246 is positioned above the lower flange 247, and there is a ring-shaped groove between the upper flange 246 and the lower flange 247. The joint section 248 is a portion to be joined to the inner circumference surface of the bag main body 22.

<Configuration of Pump Section 40>

The configuration of the spout section 24 according to the embodiment of the present invention has been described above. Next, a configuration of the pump section 40 according to the embodiment of the present invention will be described.

Figure 6:
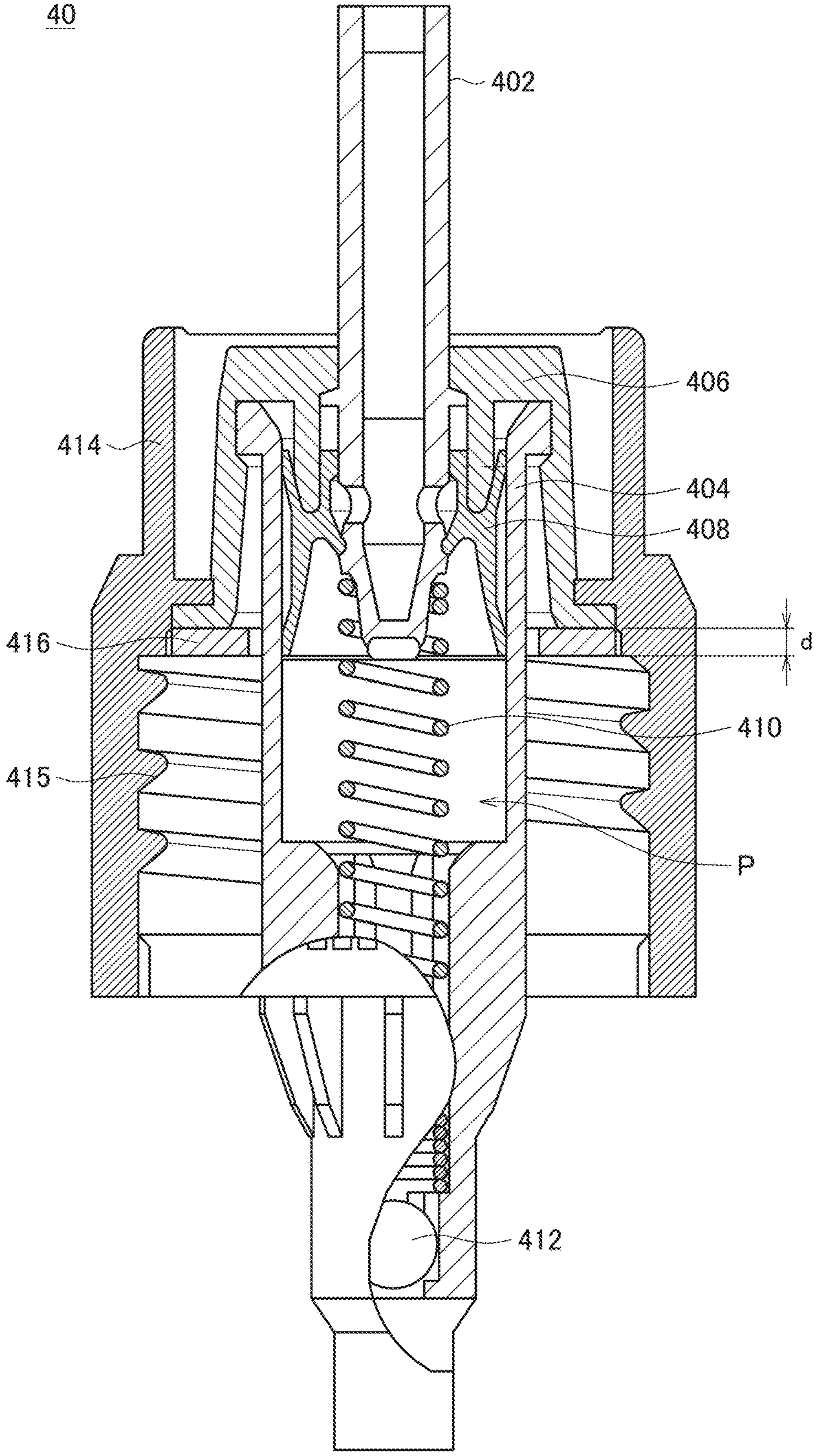
FIG. 6 is a partial cross-sectional view of a pump section 40 according to the embodiment of the present invention.

FIG. 6 is a partial cross-sectional view of the pump section 40 according to the embodiment of the present invention. As illustrated in FIG. 6, the pump section 40 includes a stem 402 a housing 404, a housing cap 406, a piston 408, a spring 410, a ball valve 412, and an outer tube section 414.

The stem 402 has a hollow section serving as a flow path for the fluid. The stem 402 supports the piston 408 in such a manner that the piston 408 is movable along the up-down direction. The stem 402 has a hole that communicates with a pump room P to be described later. Through the hole, the fluid flows into the stem 402 from the pump room P. The housing 404 has a tubular shape. The housing cap 406 is attached to the housing 404 in such a manner that the housing cap 406 closes an upper opening of the housing 404. The housing cap 406 has an opening, and the stem 402 is inserted into the opening.

The piston 408 is supported in the housing 404 in such a manner that the piston 408 is able to reciprocate along the up-down direction. The pump room P that temporarily stores the fluid is formed between the piston 408 and the housing 404. The spring 410 has an end fixed to an inside of the housing 404, and the other end fixed to a lower edge of the stem 402. The spring 410 is an example of an elastic body that biases the stem 402 toward the upper direction. The ball valve 412 is an example of a valve body and is supported below the spring 410 in the housing 404. The ball valve 412 allows the fluid to flow into the stem 402 from the bag main body 22 and prevents the fluid from leaking into the bag main body 22 from the stem 402.

The outer tube section 414 is positioned outside the housing 404. The outer tube section 414 has an inner circumference surface provided with a screw section 415 into which the screw section 243 of the spout section 24 is to be screwed. A gasket 416 is a ring-shaped member positioned above the screw section 415 and between the outer tube section 414 and the housing 404. The gasket 416 abuts on an upper end surface of the tube section 242 of the spout section 24. In this specification and the appended drawings, the example in which the outer tube section 414 is separated from the shoulder section 50 is described. However, it is also possible to integrally form the outer tube section 414 and the shoulder section 50 in such a manner that the outer tube section 414 and the shoulder section 50 serve as a single part.

Note that, the gasket 416 desirably has a thickness d that is greater than or equals to a value obtained when dividing pitch of the screw section 415 by the number of the recess sections 245 of the protrusion section 244 of the spout section 24 or the number of fitting sections 54 (to be described later) of the shoulder section 50. For example, in a case where the pitch of the screw section 415 is 3.2 mm and the number of recess sections of the protrusion section 244 of the spout section 24 is two, the thickness d of the gasket 416 may be greater than or equal to 1.6 mm (for example, 1.8 mm), which is obtained when dividing 3.2 mm by 2.

<Configuration of Shoulder Section 50>

The configuration of the pump section 40 according to the embodiment of the present invention has been described above. Next, a configuration of the shoulder section 50 according to the embodiment of the present invention will be described.

Figure 7:
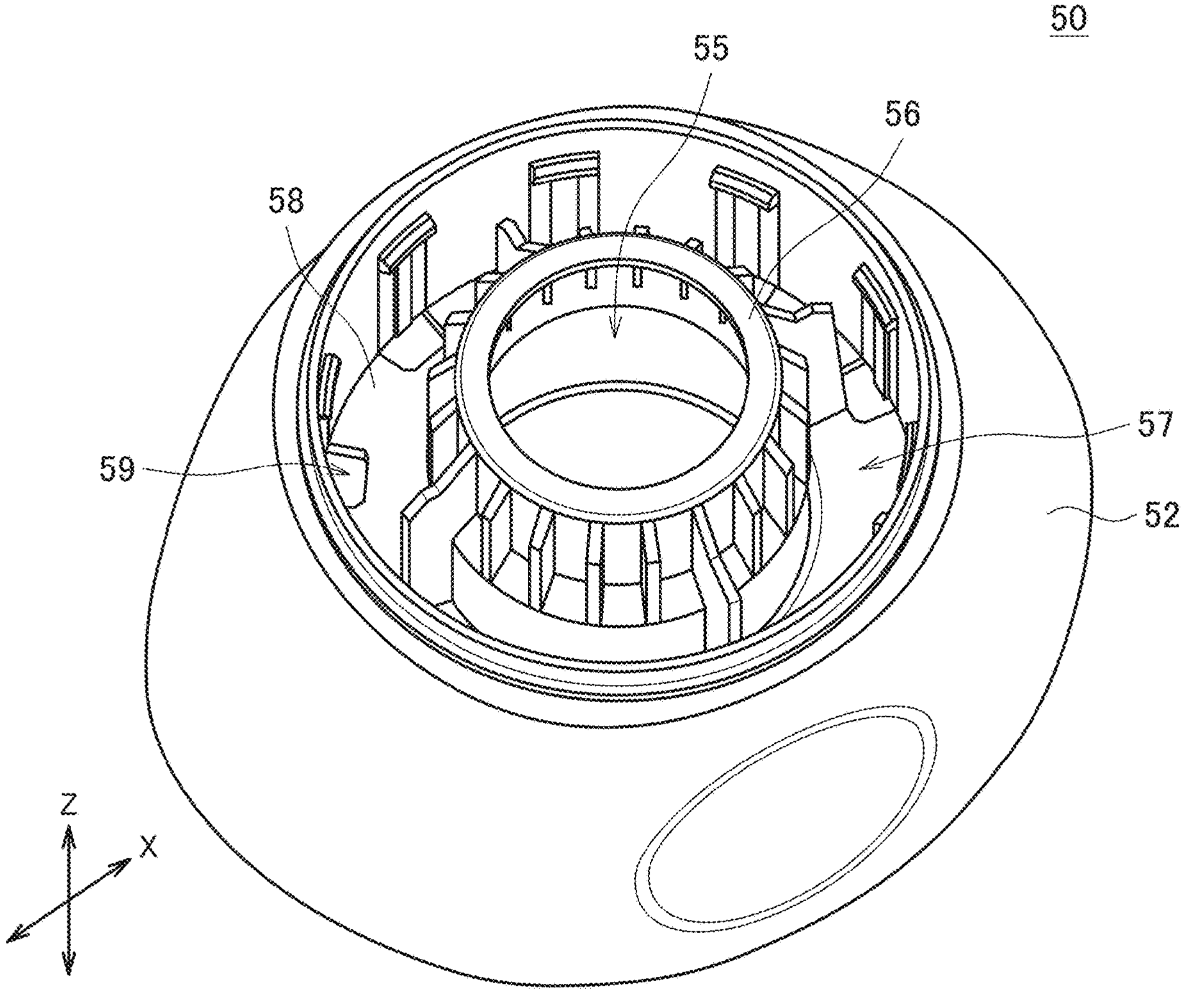
FIG. 7 is a perspective view of a shoulder section 50 according to the embodiment of the present invention when viewed from above.
Figure 8:
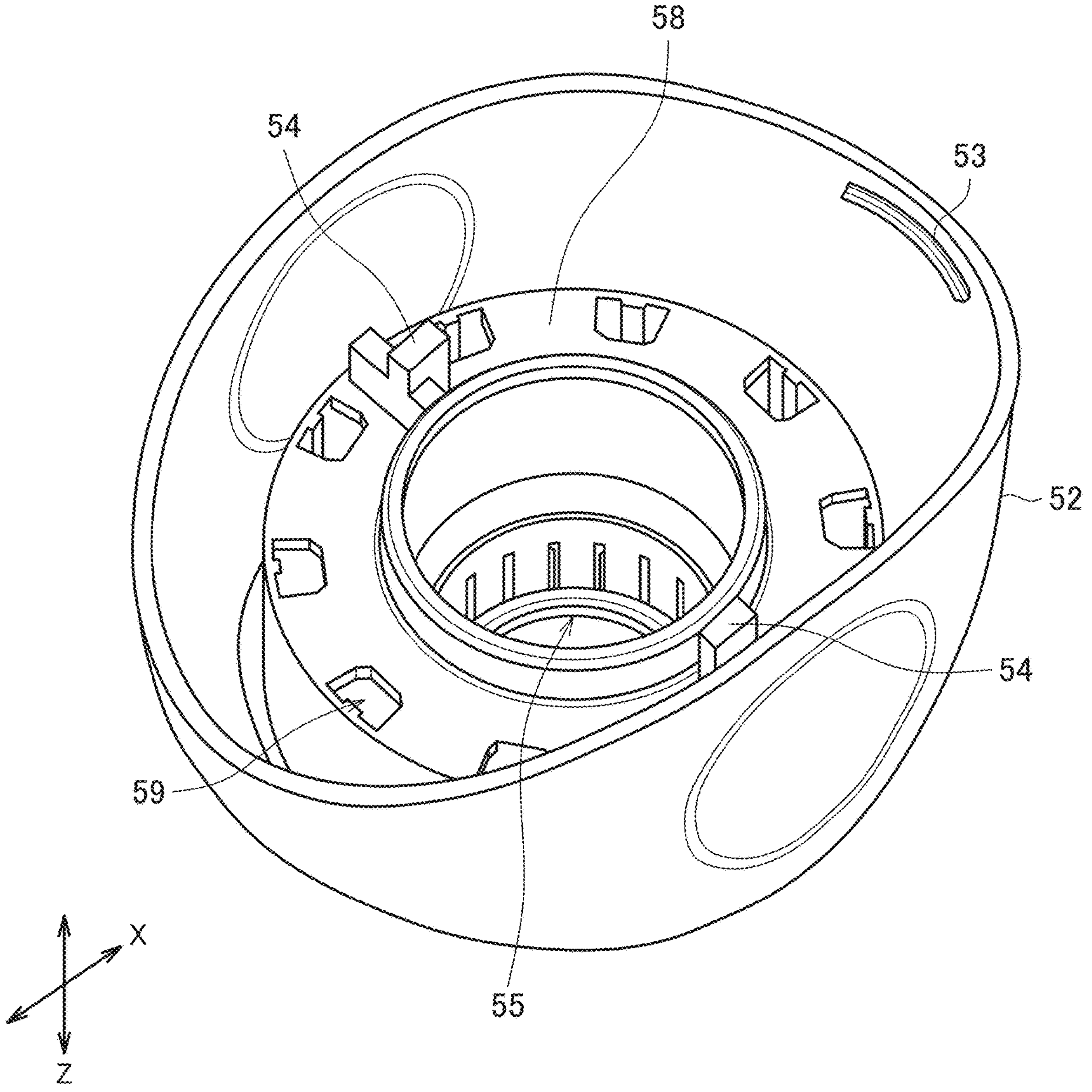
FIG. 8 is a perspective view of the shoulder section 50 according to the embodiment of the present invention when viewed from below.

FIG. 7 is a perspective view of the shoulder section 50 according to the embodiment of the present invention when viewed from above. FIG. 8 is a perspective view of the shoulder section 50 according to the embodiment of the present invention when viewed from below. As illustrated in FIG. 7 and FIG. 8, the shoulder section 50 includes an outer circumference section 52, an inner tube section 56, a groove 57, and a bottom section 58.

The outer circumference section 52 has a tapered shape in such a manner that the outer circumference section 52 has an outer diameter that gets smaller toward its upper side. For example, the outer circumference section 52 has an oval cross-sectional shape. As illustrated in FIG. 8, the outer circumference section 52 has an inner circumference surface provided with a rib 53. For example, the two ribs 53 are formed at both edge of the inner circumference surface of the outer circumference section 52 in the width direction.

The inner tube section 56 is positioned inside the outer circumference section 52. The inner tube section 56 has a hollow section 55 therein. The hollow section 55 stores a part of the pump section 40. The groove 57 is a ring-shaped groove formed along the up-down direction between the outer circumference section 52 and the inner tube section 56. The bottom section 58 is a portion serving as a bottom of the groove 57. The bottom section 58 has a plurality of holes 59 serving as flow paths for air.

In addition, the bottom section 58 has a lower surface provided with a plurality of the fitting sections 54 that protrude downward. In the example illustrated in FIG. 8, the two fitting sections 54 are formed at positions separated in a direction perpendicular to the width direction. The fitting sections 54 fit with the recess sections 245 of the protrusion section 244 of the spout section 24. Details thereof will be described with reference to FIG. 9.

Figure 9:
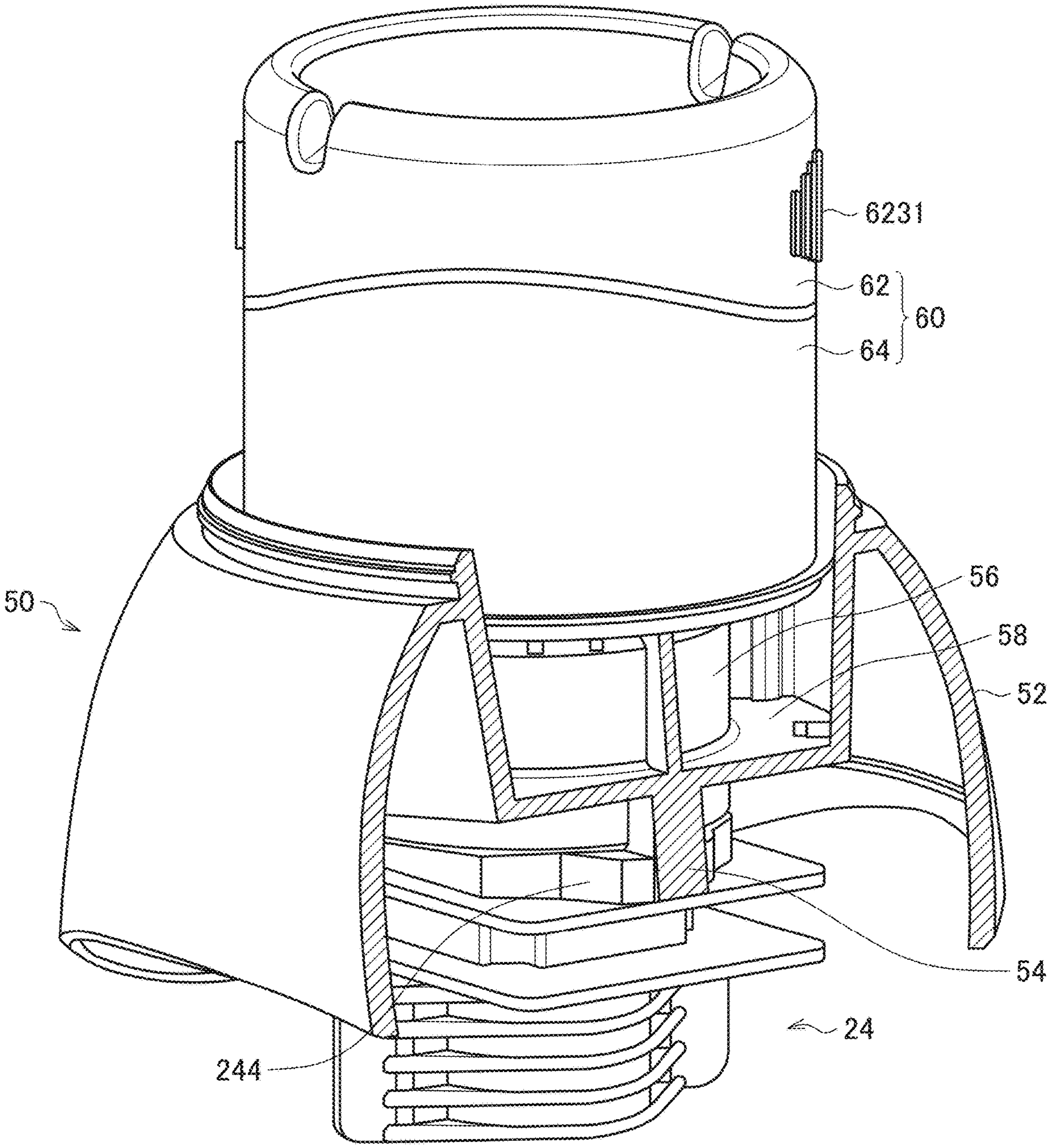
FIG. 9 is an explanatory diagram illustrating fit between the spout section 24 and the shoulder section 50 and illustrating a state of installing a discharge section 60.

FIG. 9 is an explanatory diagram illustrating fit between the spout section 24 and the shoulder section 50. When the user is screwing the spout section 24 into the pump section 40 to attach the pump section 40 to the bag container 20, the spout section 24 rotates with respect to the shoulder section 50. Next, when the spout section 24 takes a posture toward the shoulder section 50 in such a manner that the fitting sections 54 of the shoulder section 50 suit the recess sections 245 of the protrusion section 244 of the spout section 24, the fitting sections 54 of the shoulder section 50 fit with the recess sections 245 of the protrusion section 244 of the spout section 24 as illustrated in FIG. 9. In other words, the fitting sections 54 make it possible to position the bag container 20 in such a manner that the bag container 20 provided with the spout section 24 is attached in a predetermined posture. For example, such a configuration makes it possible to store the bag container 20 in the exterior container 30 in such a manner that the longitudinal direction of the exterior container 30 suits the longitudinal direction of the bag container 20 in a case where the exterior container 30 and the bag container 20 have oval shapes when viewed in plan view.

Note that, when the fitting sections 54 of the shoulder section 50 fit with the recess sections 245 of the protrusion section 244 of the spout section 24, there may be a difference of half the circumference in an amount of screwing the pump section 40 into the spout section 24. Therefore, there may be a difference of length corresponding to half the pitch of the screw section 415 of the pump section 40 at an upper end position of the spout section 24 in the pump section 40. In this respect, it is possible to achieve airtightness of the bag container 20 by the upper end of the spout section 24 abutting on the gasket 416 in any case, when the gasket 416 is designed to have the thickness d corresponding to half the pitch of the screw section 415 or more, and when the gasket 416 is installed in such a manner that the gasket 416 abuts on the spout section 24 even at an assumed position where s lowest upper end position of the spout section 24 is obtained in the pump section 40.

<Configuration of Nozzle 62>

The configuration of the shoulder section 50 according to the embodiment of the present invention has been described above. Next, a configuration of the nozzle 62 according to the embodiment of the present invention will be described.

Figure 10:
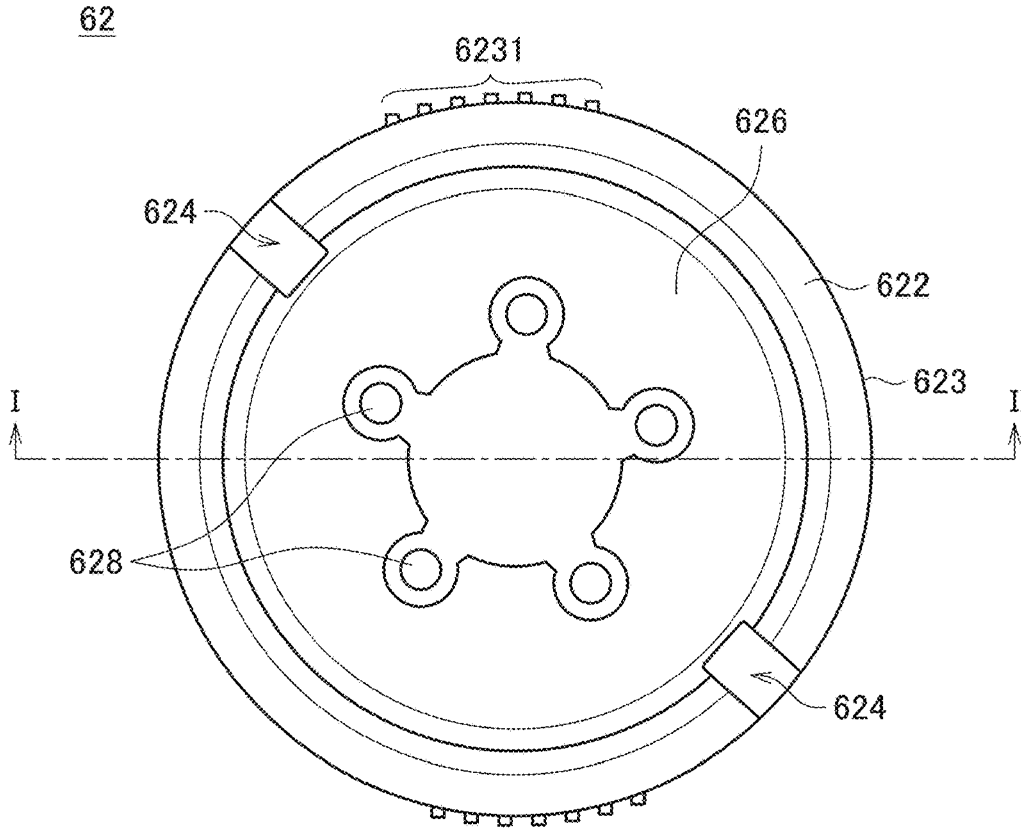
FIG. 10 is a plan view of a nozzle 62 according to the embodiment of the present invention.
Figure 11:
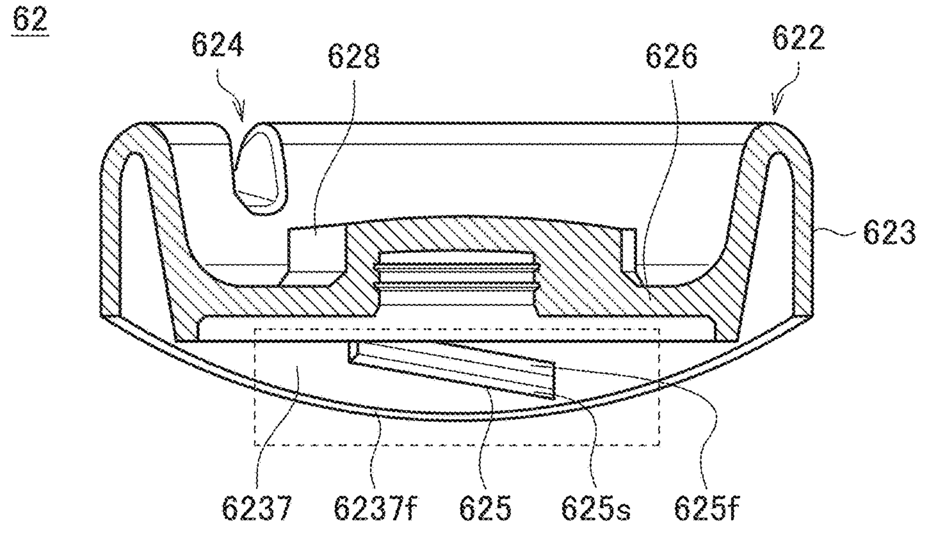
FIG. 11 is a cross-sectional view of the nozzle 62 taken along a line I-I of FIG. 10.

FIG. 10 is a plan view of the nozzle 62 according to the embodiment of the present invention. FIG. 11 is a cross-sectional view of the nozzle 62 taken along a line I-I of FIG. 10. As illustrated in FIG. 10 and FIG. 11, the nozzle 62 includes a ring-shaped section 622 and a base section 626.

The ring-shaped section 622 includes an outer ring section 623 that constitutes an outer circumference section of the ring-shaped section 622. As indicated by a dashed rectangle in FIG. 11, the outer ring section 623 has a curved shape with a portion protruding downward. The height of the outer ring section 623 from its top varies in the circumferential direction of the outer ring section 623, and this shapes a rim of the nozzle 62. The rim of the nozzle 62 has a pair of opposing protrusion sections and a pair of opposing recess sections that are successive to the protrusion sections. The maximum height of the nozzle 62 from its top is obtained in the protrusion sections, and the minimum height is obtained in the recess sections. The outer ring section 623 has an inner circumference surface provided with a pair of ribs 625. The respective ribs 625 are provided on portions that are opposed to each other in the radial direction of the outer ring section 623. More specifically, as indicated by the dashed rectangle in FIG. 11, the ribs 625 are formed at the portions protruding downward of the outer ring section 623. The ribs 625 extend in such a manner that they intersect with the up-down direction. Specifically, the ribs 625 are formed in such a manner that they extend along the protrusion sections of the rim of the nozzle 62 in the circumferential direction of the nozzle 62.

The outer ring section 623 has an outer circumference surface provided with two knob sections 6231. Each of the knob sections 6231 includes a plurality of ribs along the up-down direction. The knob sections 6231 are portions to be pinched by fingers of the user. Since each of the knob sections 6231 includes the plurality of ribs, it is possible to prevent the user from losing his/her grip when the user is twisting the nozzle 62.

As illustrated in FIG. 11, the outer ring section 623 has an upper end that is positioned above the discharge outlets 628. In addition, the upper end of the outer ring section 623 is provided with one or more recess sections 624. FIG. 10 illustrates the example in which the two recess sections 624 are formed at 180-degree intervals.

The base section 626 is positioned inside the ring-shaped section 622. The base section 626 is provided with the one or more discharge outlets 628. In the example illustrated in FIG. 10, the five discharge outlets 628 are formed on the circumference of a single circle at equal intervals. When the discharge outlets 628 discharge the fluid, the flower-shaped fluid L is formed on the hand B of the user as described above with reference to FIG. 3.

<Configuration of Nozzle Attachment Section 64>

The configuration of the nozzle 62 according to the embodiment of the present invention has been described above. Next, a configuration of the nozzle attachment section 64 according to the embodiment of the present invention will be described.

Figure 12:
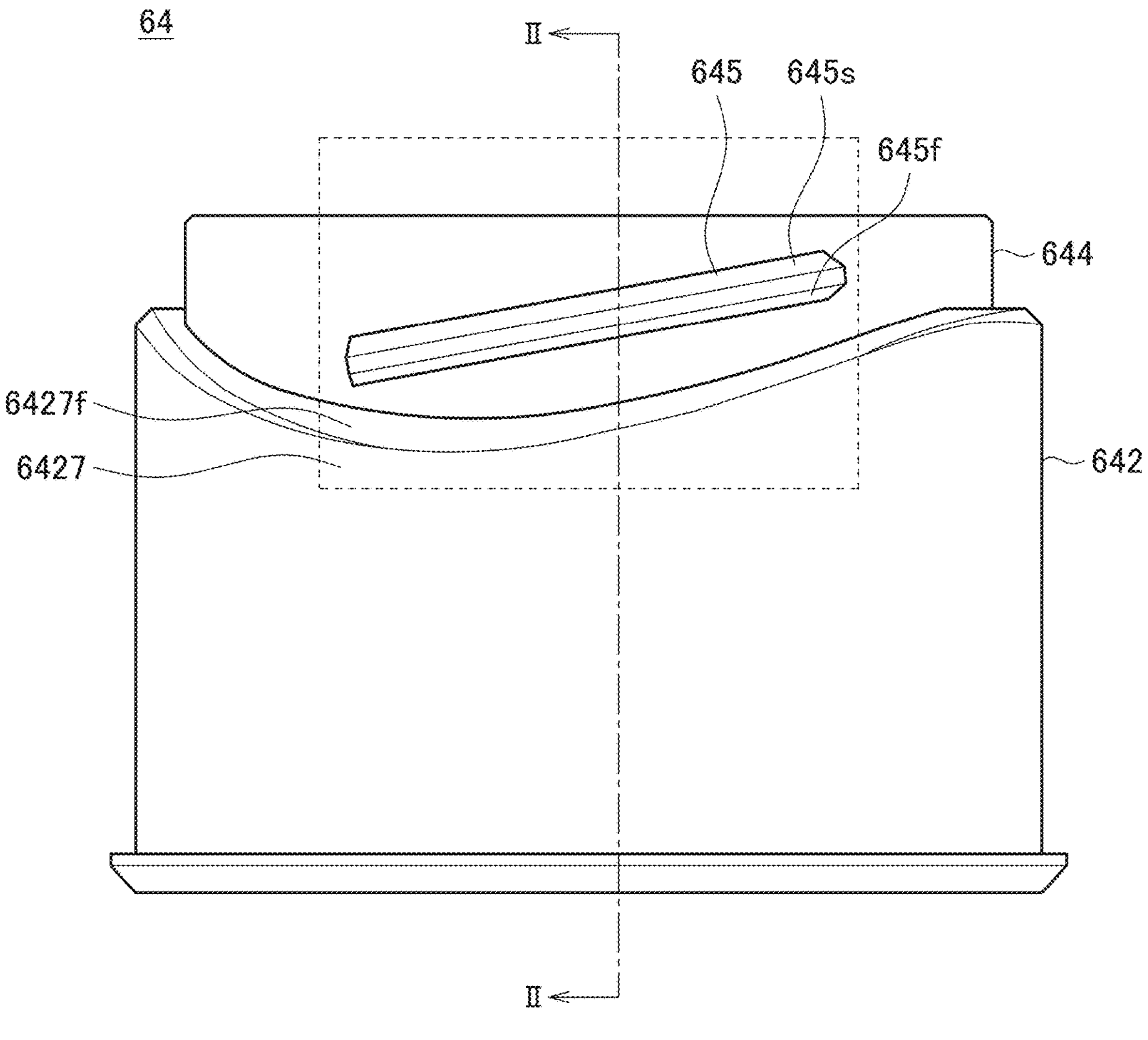
FIG. 12 is a side view of a nozzle attachment section 64 according to the embodiment of the present invention.
Figure 13:
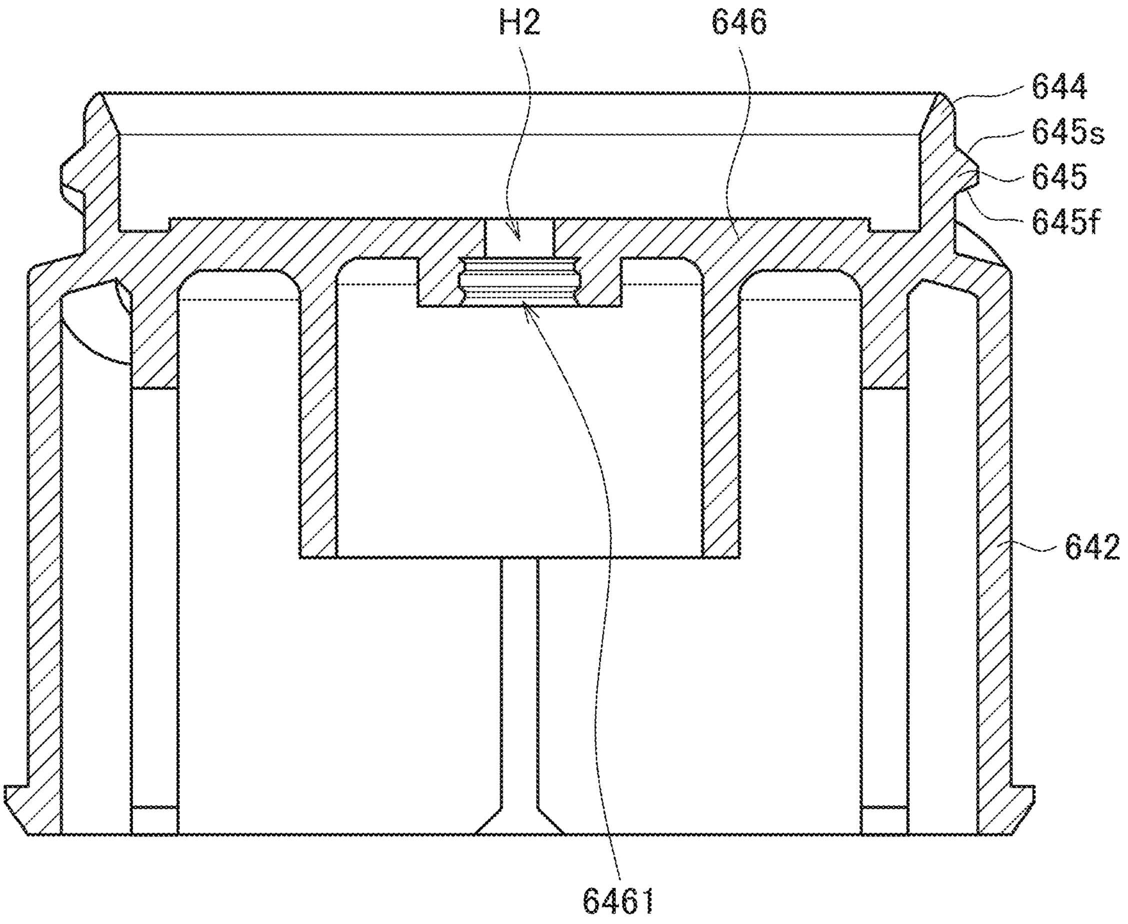
FIG. 13 is a cross-sectional view of the nozzle attachment section 64 taken along a line II-II of FIG. 12.

FIG. 12 is a side view of the nozzle attachment section 64 according to the embodiment of the present invention. FIG. 13 is a cross-sectional view of the nozzle attachment section 64 taken along a line II-II of FIG. 12. As illustrated in FIG. 12 and FIG. 13, the nozzle attachment section 64 includes a first region 642, a second region 644, and a top surface section 646.

The first region 642 is a part that constitutes an outer circumference of the nozzle attachment section 64 and is positioned below the second region 644. The second region 644 is another part that also constitutes the outer circumference of the nozzle attachment section 64 and is positioned above the first region 642. The second region 644 has a smaller outer diameter than the first region 642. The first region 642 is a sleeve of the nozzle attachment section 64. A maximum height of the first region 642 from its bottom to its top is smaller than a maximum height of the nozzle attachment section 64 from its bottom to its top. The height of the first region 642 from its bottom varies in the circumferential direction of the nozzle attachment section 64, and this shapes a rim of the first region 642. The rim of the first region 624 has a curved shape and has a pair of protrusion sections (portions protruding upward) and a pair of recess sections (portion protruding downward) that are successive to the protrusion sections, as portions that are opposed to each other in the radial direction of the nozzle attachment section 64. The maximum height of the first region 642 is obtained in the protrusion sections, and the minimum height is obtained in the recess sections.

Figure 33:
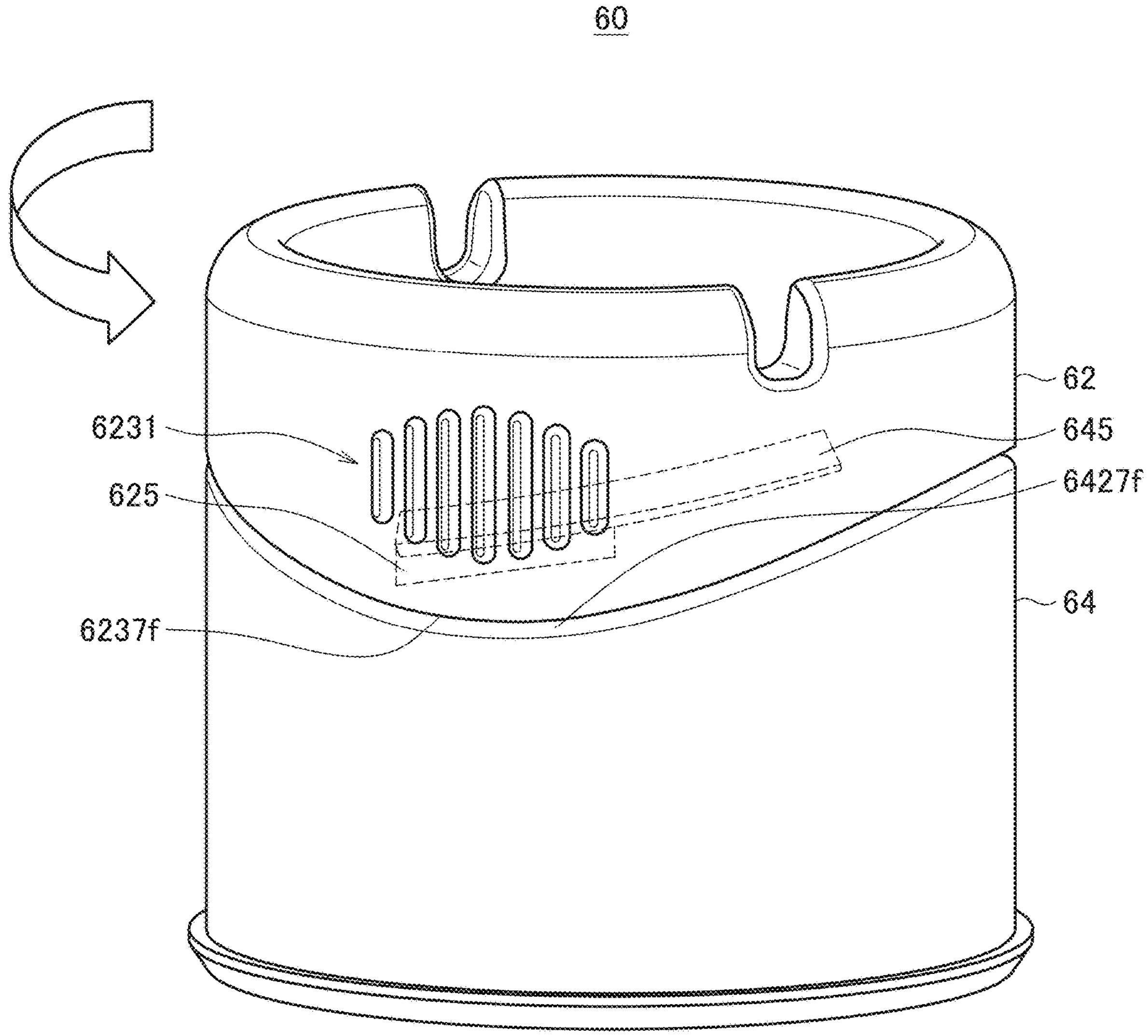
FIG. 33 is an explanatory diagram illustrating a situation where the nozzle 62 is being detached.
Figure 34:
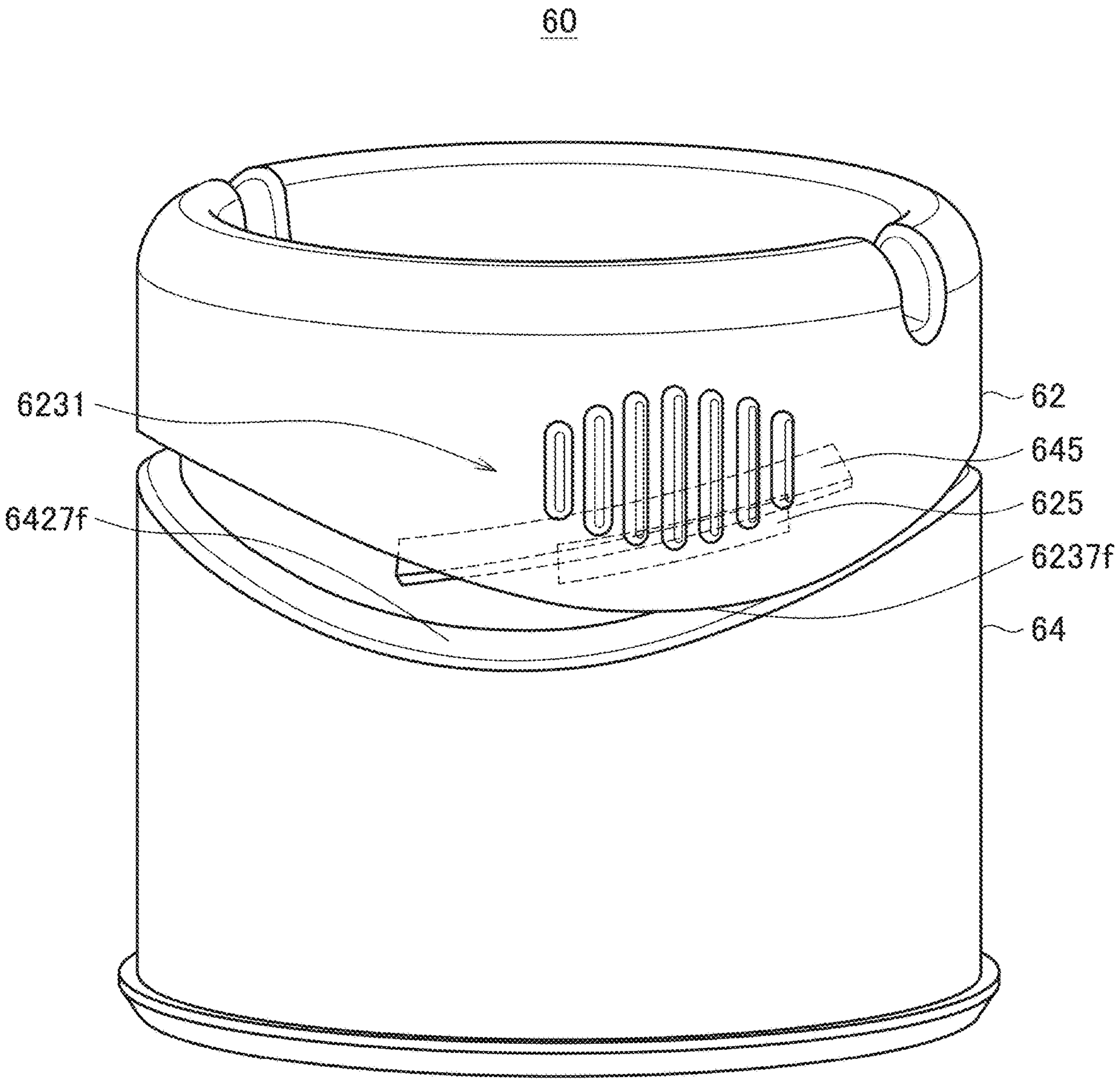
FIG. 34 is an explanatory diagram illustrating the situation where the nozzle 62 is being detached.

As indicated by a dashed rectangle in FIG. 12, the second region 644 has a curved shape with portions protruding downward. Ribs 645 are formed on the portions protruding downward of an outer circumference surface of the second region 644. The pair of ribs 645 is formed on the nozzle attachment section 64, and the respective ribs 645 are provided on portions that are opposed to each other in the radial direction of the nozzle attachment section 64. The ribs 645 are formed in such a manner that ribs 645 extend while they intersect with the up-down direction, specifically, in such a manner that they extend along the recess sections of the rim of the first region 642 in the circumferential direction of the nozzle attachment section 64. The nozzle 62 is attached to the nozzle attachment section 64 when the ribs 625 of the nozzle 62 goes over the ribs 645. As illustrated in FIG. 33, the ribs 625 of the nozzle 62 are disposed along the ribs 645 of the nozzle attachment section 64 in a state where the nozzle 62 is attached. The protrusion sections of the rim of the nozzle 62 are disposed along the recess sections of the rim of the first region (sleeve) 642 of the nozzle attachment section 64. The recess sections of the rim of the nozzle 62 are disposed along the protrusion sections of the rim of the first region (sleeve) 642 of the nozzle attachment section 64. In addition, as illustrated in FIG. 34, when the user is twisting the nozzle 62 off the nozzle attachment section 64 while pinching the knob sections 6231 of the nozzle 62, a lower end of the outer ring section 623 of the nozzle 62 (the protrusion sections of the rim of the nozzle 62) moves along an interface (the recess sections of the rim of the sleeve) between the first region 642 and the second region 644, and the nozzle 62 is lifted from the nozzle attachment section 64. Further, the nozzle 62 is detached from the nozzle attachment section 64 when the positions of the ribs 645 and the ribs 625 of the nozzle 62 are displaced by twisting the nozzle 62.

The top surface section 646 is positioned inside the second region 644 and is a plate section having a circular shape. The top surface section 646 has an opening H2. Via the opening H2, the fluid is supplied to the discharge outlets 628 of the nozzle 62. In addition, the top surface section 646 has a lower surface provided with a stem fitting section 6461. The stem fitting section 6461 is a recess section that communicates with the opening H2. The stem fitting section 6461 fits with a tip of the stem 402. This makes it possible for the fluid pumped by the pump section 40 to flow out from the opening H2.

<Whole Cross-Sectional Configuration and Behavior>

The respective configurations of the structural elements included in the container 10 according to the embodiment of the present invention have been described above. Next, a cross-sectional configuration and behavior of the container 10 according to the embodiment of the present invention will be described.

Figure 14:
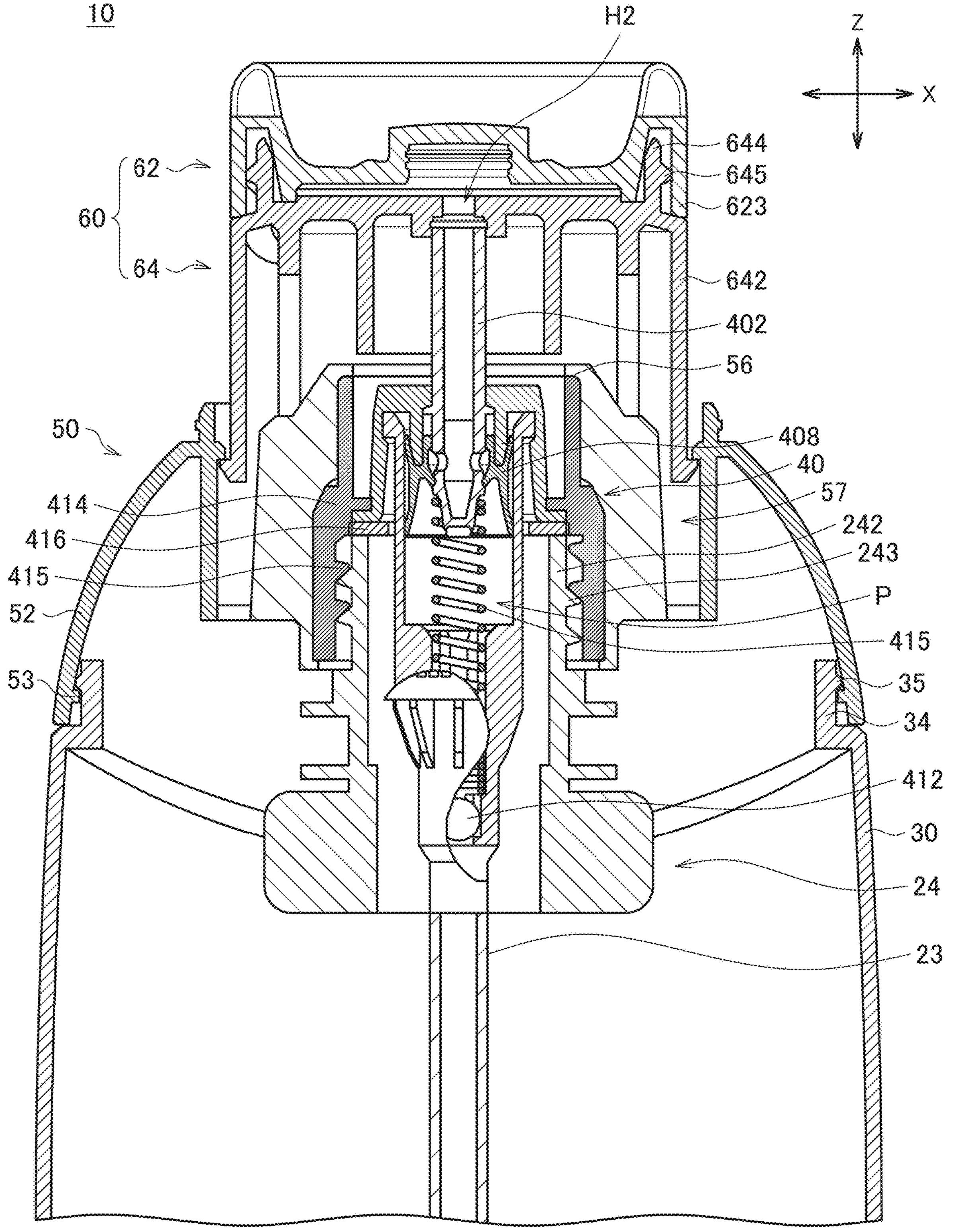
FIG. 14 is a cross-sectional view of the container 10 (taken along a line II-II illustrated in FIG. 12) according to the embodiment of the present invention.

FIG. 14 is a cross-sectional view of the container 10 according to the embodiment of the present invention. Note that, the bag main body 22 is omitted in FIG. 14. As illustrated in FIG. 14, the shoulder section 50 is detachably attached to the exterior container 30 when the ribs 35 of the exterior container 30 engage with the ribs 53 of the shoulder section 50.

In addition, the pump section 40 is attached to the spout section 24 when the screw section 243 of the spout section 24 is screwed into the screw section 415 of the pump section 40. At this time, it is possible to achieve airtightness of the bag container 20 when the gasket 416 abuts on the upper end of the tube section 242 of the spout section 24. Note that, as described with reference to FIG. 9, the fitting sections 54 of the shoulder section 50 fit with the recess sections 245 of the protrusion section 244 of the spout section 24.

The container 10 discharges the fluid toward the discharge receiver when the nozzle 62 is pressed against the discharge receiver. Specifically, when the nozzle 62 is pressed against the discharge receiver, the nozzle 62 and the nozzle attachment section 64 go down in the groove 57 formed on the shoulder section 50. The stem 402 fits with the stem fitting section 6461 of the nozzle attachment section 64, and the stem 402 connects with the piston 408. Therefore, the stem 402 and the piston 408 integrally go down when the nozzle attachment section 64 goes down. Accordingly, the pump room P has a higher inner pressure, the fluid temporarily stored in the pump room P is pumped through the stem 402, the fluid passes through the opening H2 of the nozzle attachment section 64, and the fluid is discharged from the discharge outlets 628 (see FIG. 10, for example).

Next, when the press of the nozzle 62 against the discharge receiver is canceled, the stem 402 and the piston 408 rise due to elastomeric force of the screw section 415, the nozzle 62 and the nozzle attachment section 64 also rise as the stem 402 and the piston 408 rise, and the stem 402, the piston 408, the nozzle 62, and the nozzle attachment section 64 return to their initial positions. When the stem 402 and the piston 408 go up, negative pressure is generated in the pump room P. This makes it possible to open the ball valve 412 and allow the fluid to flow into the pump room P from the storage space of the bag main body 22 through a dip tube 23 (see FIG. 14).

<Actions and Effects>

The above-described embodiment of the present invention achieves various actions and effects. For example, the bag container 20 according to the embodiment of the present invention is attachable/detachable to/from the exterior container 30 and the pump section 40. Therefore, it is possible to continue using the exterior container 30, the pump section 40, and other members by replacing the bag container 20 with a new bag container 20 in a case of run out of the fluid in the bag container 20. Accordingly, the container 10 according to the embodiment of the present invention contributes to environmental protection.

In addition, according to the embodiment of the present invention, the fitting sections 54 of the shoulder section 50 fit with the recess sections 245 of the protrusion section 244 of the spout section 24, as illustrated in FIG. 5, FIG. 8, and FIG. 9. In other words, the fitting sections 54 make it possible to position the bag container 20 in such a manner that the bag container 20 provided with the spout section 24 is attached in a predetermined posture.

In addition, according to the embodiment of the present invention, the discharge section 60 includes the nozzle 62 and the nozzle attachment section 64, and the nozzle 62 is detachable from the nozzle attachment section 64, as illustrated in FIG. 2. Therefore, in a case where the fluid gets stuck in the discharge outlets 628 of the nozzle 62, it is possible to continue using other members including the nozzle attachment section 64 by replacing the nozzle 62 with a new nozzle 62. In addition, it is also possible to enjoy change in shape of discharged fluid by replacing the nozzle 62 with another nozzle 62 having discharge outlets 628 whose shape or arrangement is changed.

In addition, as illustrated in FIG. 10 and FIG. 11, the upper end of the ring-shaped section 622 of the nozzle 62 is positioned above the discharge outlets 628. Such a configuration makes it possible to cause the ring-shaped section 622 to abut on the discharge receiver when the nozzle 62 is pressed against the discharge receiver. This makes it possible to ensure a gap between the discharge outlets 628 and the discharge receiver.

In addition, as illustrated in FIG. 12 and FIG. 13, the nozzle attachment section 64 includes the first region 642, the second region 644, and the top surface section 646. The second region 644 is another part that also constitutes the outer circumference of the nozzle attachment section 64 and is positioned above the first region 642. The second region 644 has a smaller outer diameter than the first region 642. The outer circumference surface of the second region 644 is provided with the ribs 645, and the inner circumference surface of the outer ring section 623 is provided with the ribs 625. The nozzle 62 is attached to the nozzle attachment section 64 when the ribs 625 of the nozzle 62 go over the ribs 645.

In addition, as illustrated in FIG. 12, the ribs 645 are formed on the portions protruding downward of the outer circumference surface of the second region 644.

The ribs 645 are also formed on the portions protruding downward of the inner circumference surface of the outer ring section 623. When the user is twisting the nozzle 62 off the nozzle attachment section 64 toward a direction of an arrow (first rotation direction) while pinching the knob sections 6231 of the nozzle 62 as illustrated in FIG. 33, the lower end of the outer ring section 623 of the nozzle 62 moves along the interface between the first region 642 and the second region 644, and the nozzle 62 is lifted from the nozzle attachment section 64 as illustrated in FIG. 34. Further, the nozzle 62 is detached from the nozzle attachment section 64 when the positions of the ribs 645 and the ribs 625 of the nozzle 62 are displaced by twisting the nozzle 62.

<Modification>

The embodiment of the present invention has been described above. Next, some modifications of the above-described embodiment will be described. Note that, modifications to be described below may be applied to the above-described embodiment alone or in combination. In addition, modifications to be described below may be applied instead of or in addition to the structural elements according to the above-described embodiment.

(Modification of Discharge Section)

Figure 15:
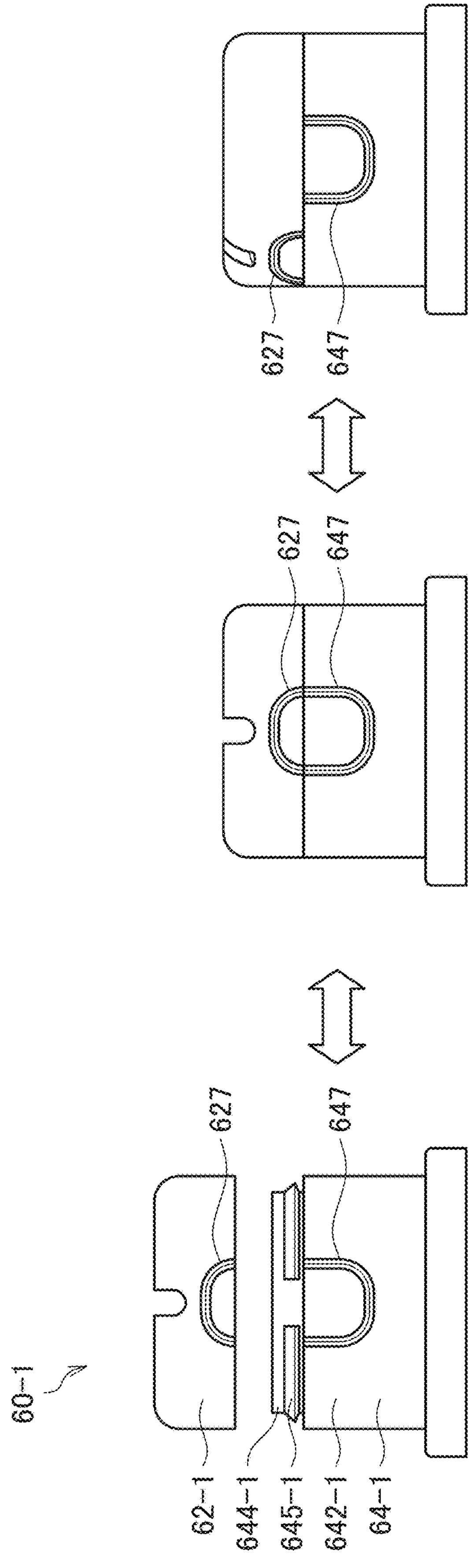
FIG. 15 is an explanatory diagram illustrating a discharge section 60-1 according to a modification.

FIG. 15 is an explanatory diagram illustrating a discharge section 60-1 according to a modification. As illustrated in a left side of FIG. 15, the discharge section 60-1 according to a first modification includes a nozzle 62-1 and a nozzle attachment section 64-1. The nozzle attachment section 64-1 includes a first region 642-1 and a second region 644-1. The first region 642-1 has an outer circumference surface provided with a positioning rib 647. The second region 644-1 has an outer circumference surface provided with a rib 645-1 along a circumferential direction. The rib 645-1 has a gap at a circumferential position corresponding to a position where the positioning rib 647 is formed in the circumferential direction.

The nozzle 62-1 has an outer circumference surface provided with a positioning rib 627. A protrusion (not illustrated) is formed on an inner circumference surface of the nozzle 62-1 at a circumferential position corresponding to a position where the positioning rib 627 is formed. The user twists the nozzle 62-1 into the nozzle attachment section 64-1 in a state where the protrusion passes through the gap of the rib 645-1 and the nozzle 62-1 is attached to the nozzle attachment section 64-1 as illustrated in a middle of FIG. 15. This allows the protrusion of the nozzle 62-1 to engage with the rib 645-1, and it is possible to reduce a possibility of a fall of the nozzle 62-1.

In addition, it is also possible for the user to detach the nozzle 62-1 from the nozzle attachment section 64-1 by aligning the position of the positioning rib 627 with the position of the positioning rib 647 and separating the nozzle 62-1 from the nozzle attachment section 64-1.

(Modification of Exterior Container)

Figure 16:
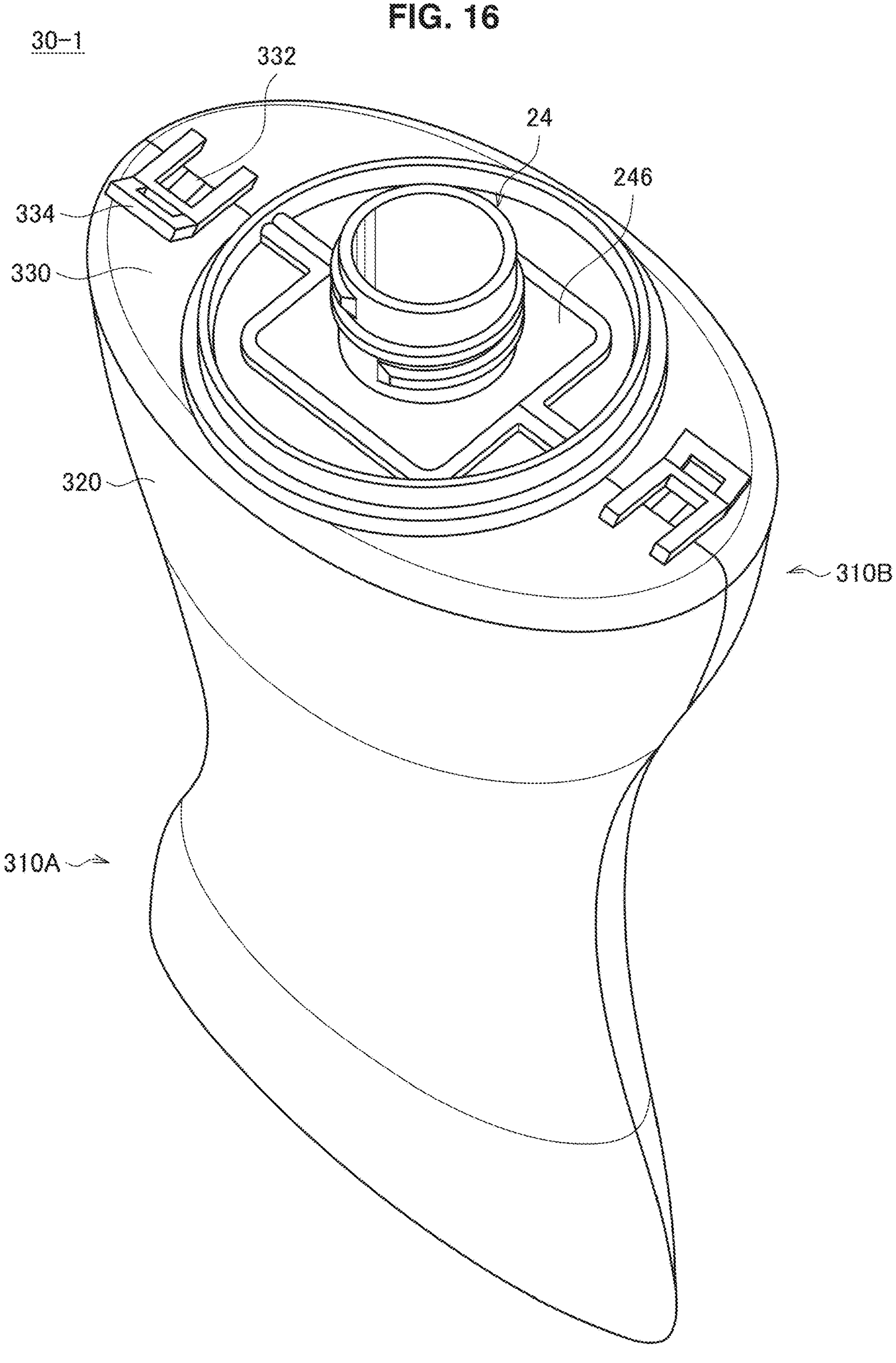
FIG. 16 is an explanatory diagram illustrating an exterior container 30-1 serving as a first modification of the exterior container 30.

FIG. 16 is an explanatory diagram illustrating an exterior container 30-1 serving as a first modification of the exterior container 30. As illustrated in FIG. 16, the exterior container 30-1 includes two exterior members 310A and 310B that are opposed to each other.

Figure 17:
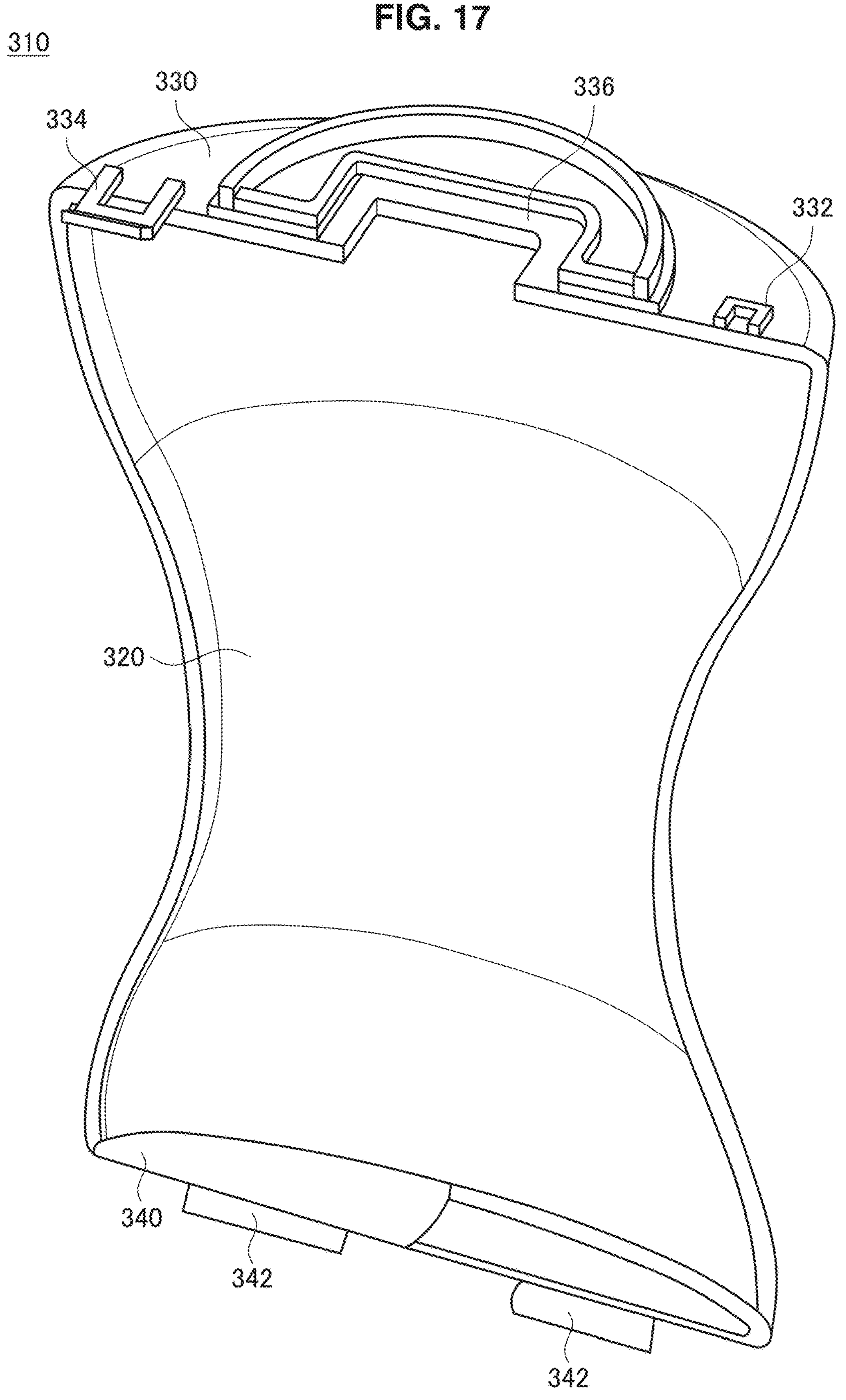
FIG. 17 is an explanatory diagram illustrating a configuration of an exterior member 310.

FIG. 17 is an explanatory diagram illustrating a configuration of the exterior member 310. As illustrated in FIG. 16 and FIG. 17, each of the exterior members 310 includes a member trunk section 320, a member top surface section 330, and a member bottom section 340. The member top surface section 330 includes a protrusion section 332 and an engagement section 334. The engagement section 334 of one of the exterior members 310 engages with the protrusion section 332 of the other of the exterior members 310. The member bottom section 340 is provided with hinge mechanisms 342. When the exterior members 310 are coupled via the hinge mechanisms 342, it is possible for the exterior members 310 to rotate about a rotation axis that extends along a width direction passing through the hinge mechanism 342. Note that, the bag container 20 is fixed to the exterior container 30-1 when a fitting section 336 fits with a groove between the upper flange 246 and a lower flange 247 of the spout section 24. The fitting section 336 is a rim of an opening of the member top surface section 330.

Figure 18:
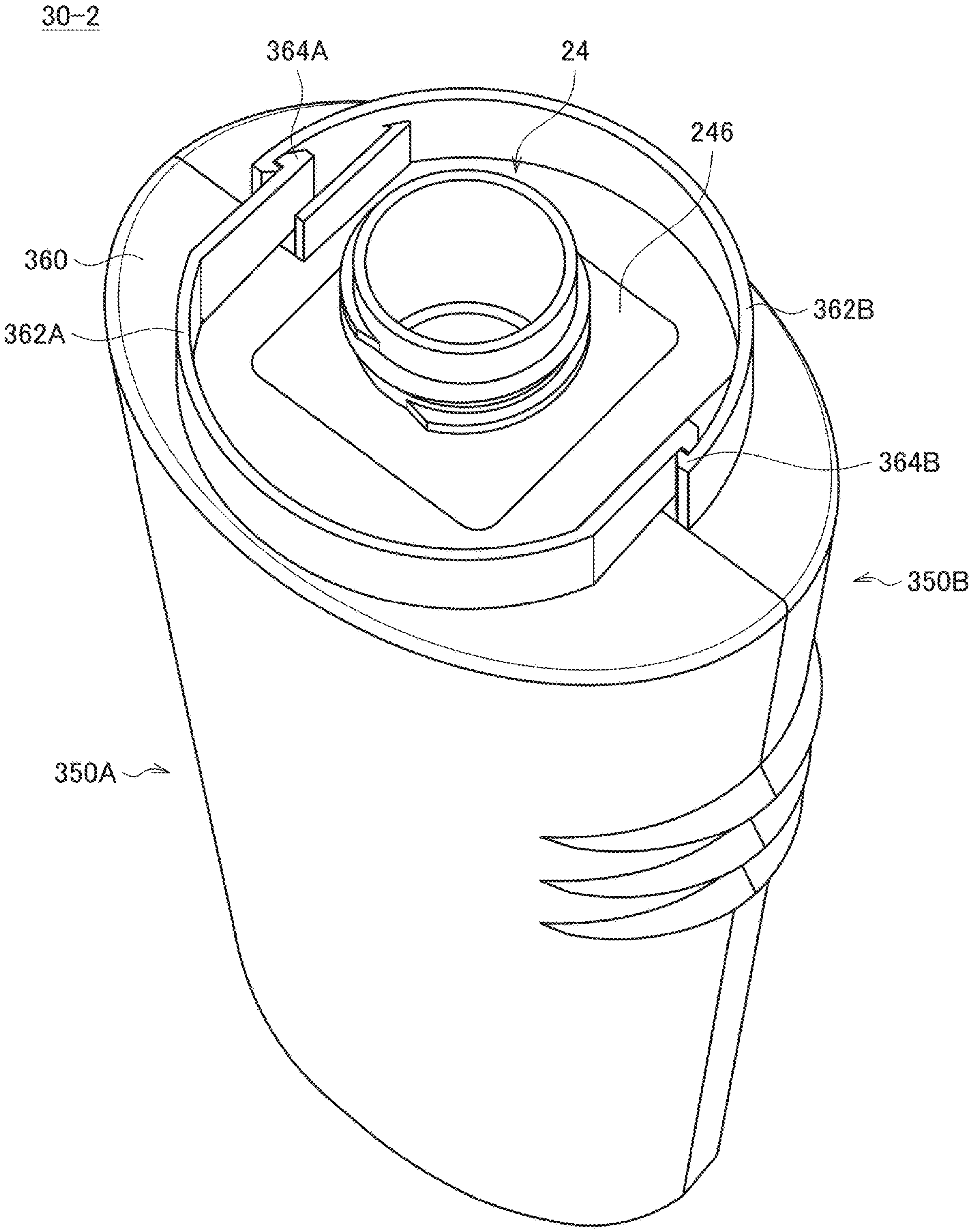
FIG. 18 is an explanatory diagram illustrating an exterior container 30-2 according to a second modification of the exterior container 30.

FIG. 18 is an explanatory diagram illustrating an exterior container 30-2 serving as a second modification of the exterior container 30. As illustrated in FIG. 18, the exterior container 30-2 according to the second modification includes an exterior member 350A and an exterior member 350B. Each of the exterior members 350 has a member top surface section 360 provided with a semi-ring section 362 that protrudes upward. The semi-ring section 362 includes both edges provided with claw sections 364. The spout section 24 is fixed to the exterior container 30-2 when a claw section 364A of the exterior member 350A engages with a claw section 364B of the exterior member 350B. Note that, the exterior container 30-2 is provided with a grip section on its side surface. The grip section includes three ribs extending across the exterior member 350A and the exterior member 350B, and this makes it easier to grip the exterior container 30-2.

(Nozzle-Attached Cap)

The bag container 20 may be unbundled in a state where a cap for closing the opening H1 of the spout section 24 is attached in addition to the bag main body 22 and the spout section 24. It is possible for the user to replace the bag container 20 by purchasing the bag container 20 that are unbundled. In addition, the nozzle 62 may be disposed on the cap of the bag container 20 in such a manner that the nozzle 62 is detachable from the cap. In other words, the bag container 20 may include the nozzle-attached cap. Such a configuration makes it possible to allow the user to replace the nozzle 62 in addition to the bag container 20. It is helpful to replace the nozzle 62 because sometimes the fluid gets stuck in the discharge outlets 628 of the nozzle 62. Next, some application examples of the nozzle-attached cap will be described.

Figure 19:
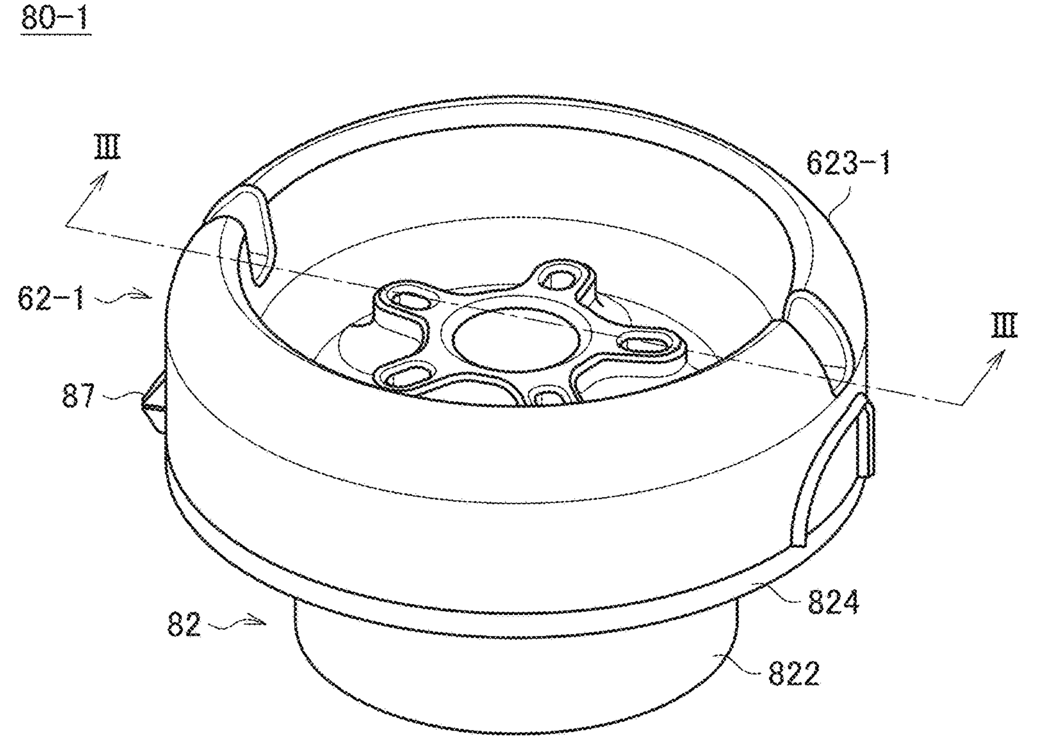
FIG. 19 is a perspective view of a nozzle-attached cap 80-1 according to a first example.
Figure 20:
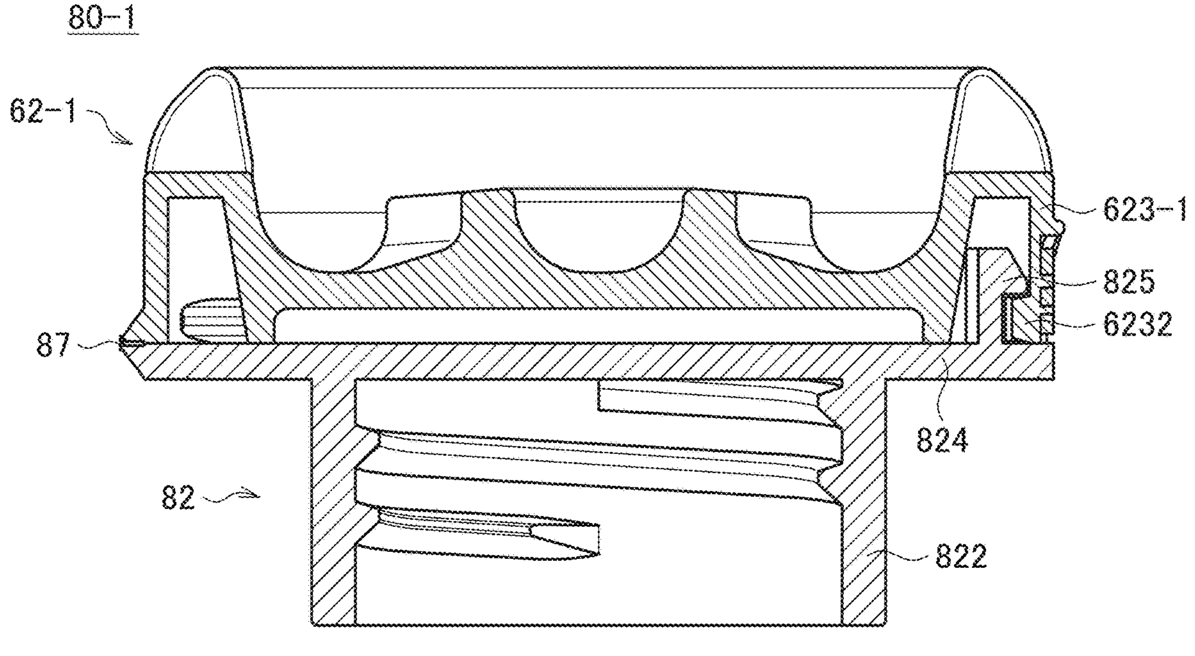
FIG. 20 is a cross-sectional view of the nozzle-attached cap 80-1 taken along a line III-III of FIG. 19.

FIG. 19 is a perspective view of a nozzle-attached cap 80-1 according to a first example. FIG. 20 is a cross-sectional view of the nozzle-attached cap 80 taken along a line III-III of FIG. 19. As illustrated in FIG. 19 and FIG. 20, the nozzle-attached cap 80-1 includes a cap 82 and the nozzle 62-1. The cap 82 and the nozzle 62-1 are coupled via a coupler section 87. The cap 82 includes a spout engagement section 822 and a cap top surface section 824. A claw section 825 protrudes from an upper surface of the cap top surface section 824. A protrusion section 6232 that protrudes inward is formed on a lower end of an outer ring section 623-1 of the nozzle 62-1. A posture of the nozzle 62-1 toward the cap 82 is fixed when the protrusion section 6232 engages with the claw section 825.

Figure 21:
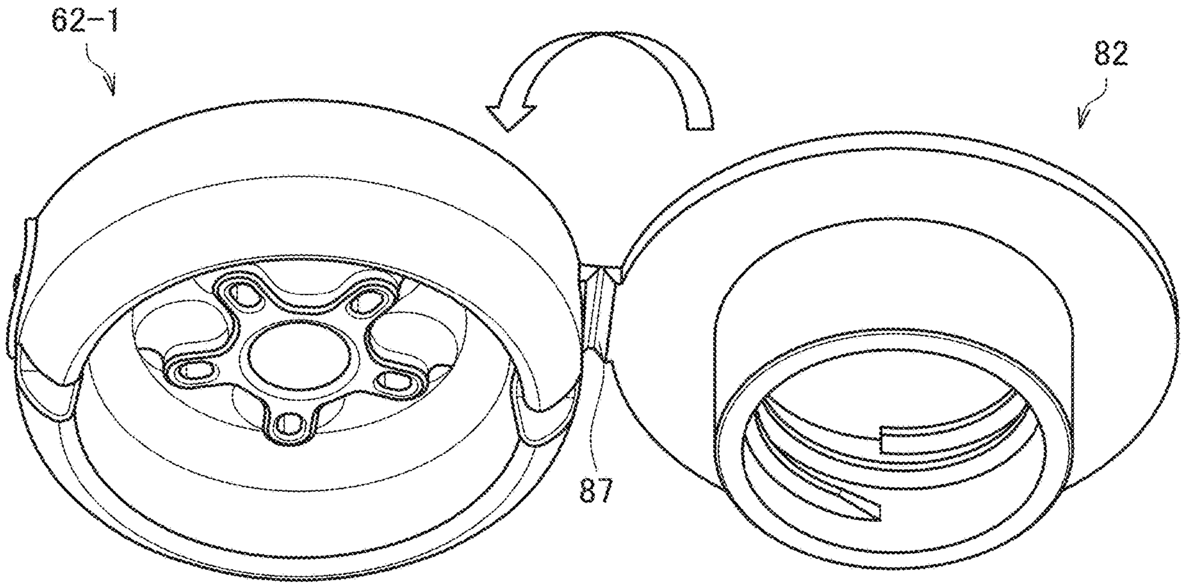
FIG. 21 is an explanatory diagram illustrating a situation where a nozzle 62-1 is being separated.
Figure 22:
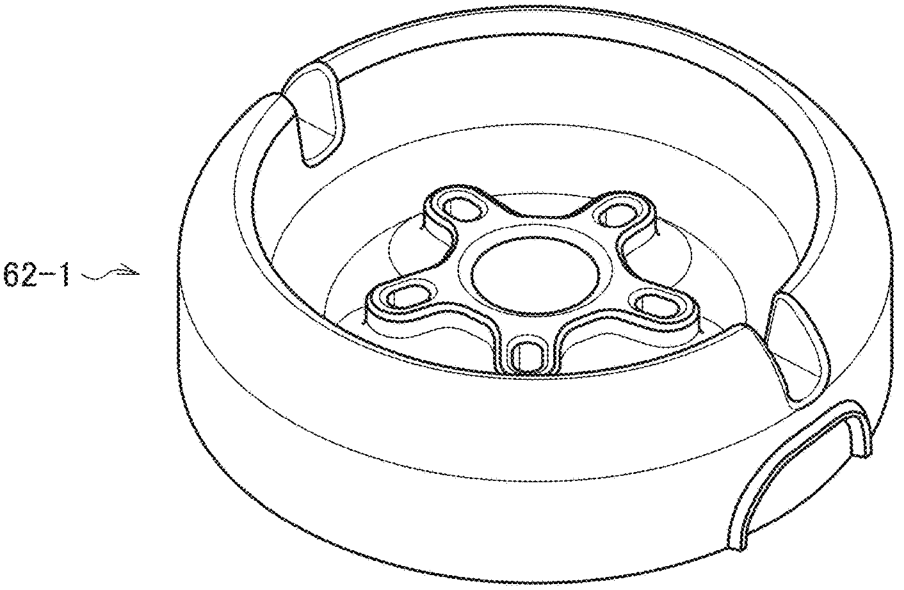
FIG. 22 is a perspective view of the nozzle 62-1 that is separated.

When the user disengages the protrusion section 6232 from the claw section 825, the nozzle 62-1 pivots via the coupler section 87 with respect to the cap 82 as illustrated in FIG. 21. Next, as illustrated in FIG. 22, it is possible to separate the nozzle 62-1 from the cap 82 when the user twists the nozzle 62-1 off the cap 82 to break the coupler section 87, for example.

Figure 23:
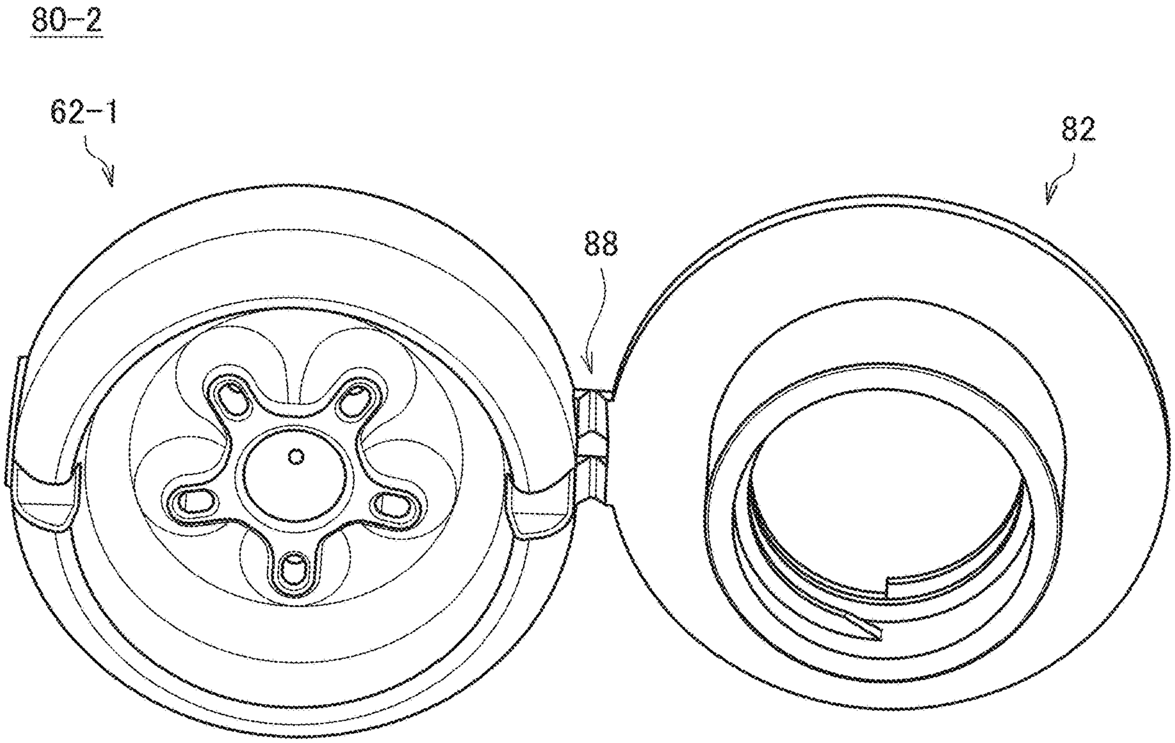
FIG. 23 is an explanatory diagram illustrating a nozzle-attached cap 80-2 according to a second example.

FIG. 23 is an explanatory diagram illustrating a nozzle-attached cap 80-2 according to a second example. As illustrated in FIG. 23, the cap 82 and the nozzle 62-1 may be coupled via a coupler section 88 having one or more holes or vulnerable sections. Such a configuration makes it easier for the user to break the coupler section 88.

Figure 24:
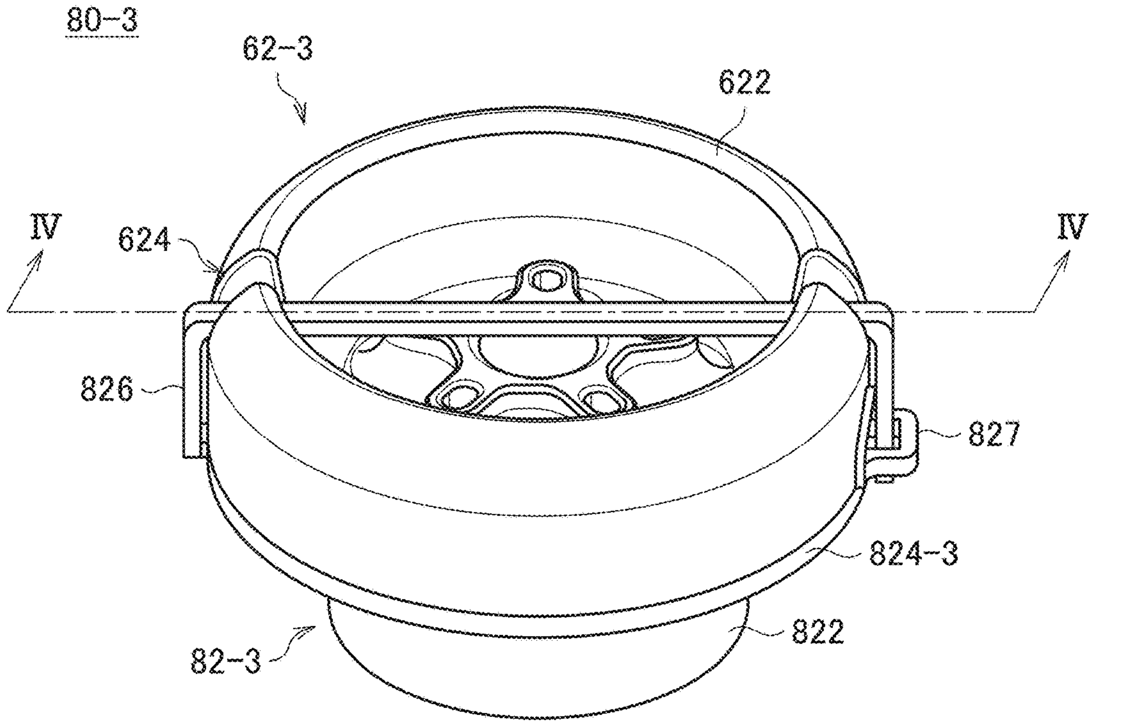
FIG. 24 is a perspective view of a nozzle-attached cap 80-3 according to a third example.
Figure 25:
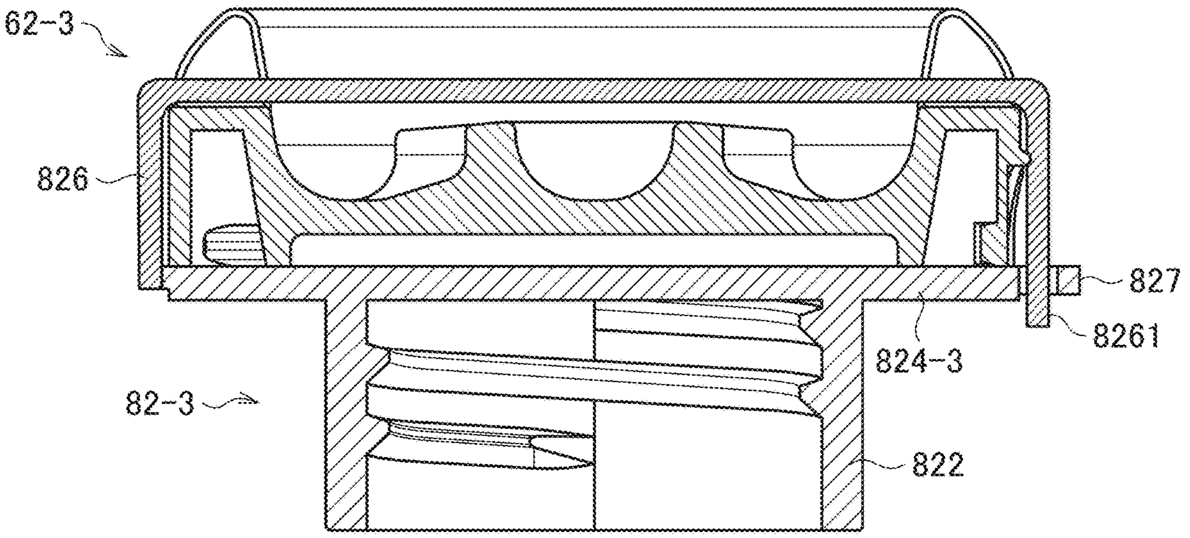
FIG. 25 is an explanatory diagram illustrating a cross-sectional view of the nozzle-attached cap 80-3 taken along a line IV-IV of FIG. 24.

FIG. 24 is a perspective view of a nozzle-attached cap 80-3 according to a third example. FIG. 25 is an explanatory diagram illustrating a cross-sectional view of the nozzle-attached cap 80-3 taken along a line IV-IV of FIG. 24. As illustrated in FIG. 24 and FIG. 25, the nozzle-attached cap 80-3 includes a cap 82-3 and a nozzle 62-3.

The cap 82-3 includes the spout engagement section 822 and a cap top surface section 824-3. The cap top surface section 824-3 is provided with a linear section 826 and a latch section 827 with a hole. The linear section 826 has a linear shape and is bendable. The linear section 826 has a tip provided with a head section 8261. In a state where the linear section 826 passes through the recess sections 624 of the ring-shaped section 622 of the nozzle 62-3, the head section 8261 passes through the hole of the latch section 827, and the latch section holds the head section 8261. This makes it possible to fix the nozzle 62-3 to the cap 82-3.

Figure 26:
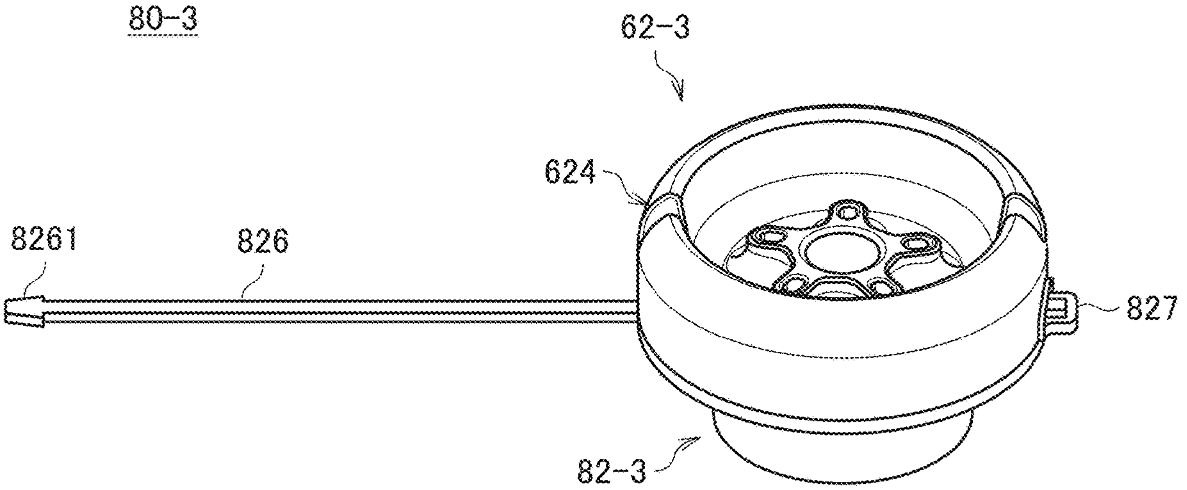
FIG. 26 is an explanatory diagram illustrating a situation where a nozzle 62-3 is being separated.
Figure 27:
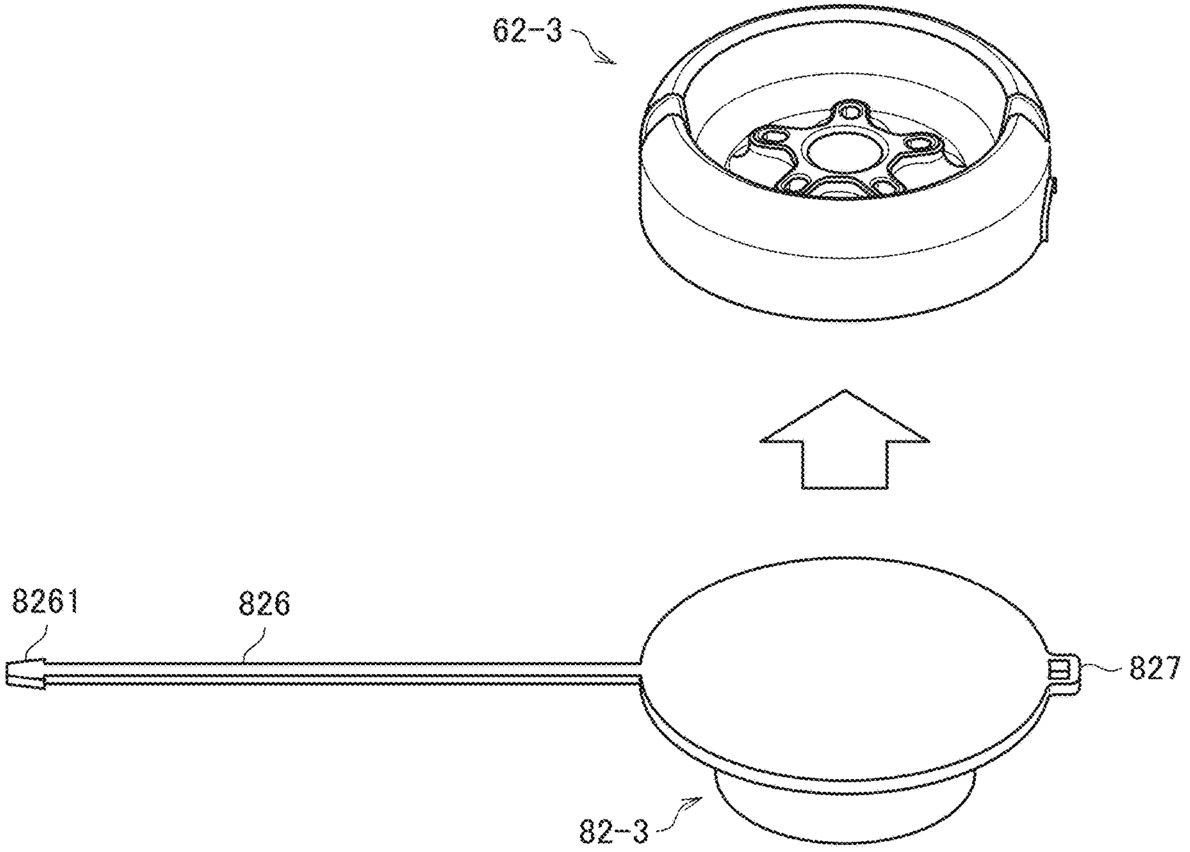
FIG. 27 is an explanatory diagram illustrating a situation where the nozzle 62-3 is separated.

When the user pulls out the head section 8261 from the hole of the latch section 827 and the linear section 826 is straightened as illustrated in FIG. 26, it is possible to separate the nozzle 62-3 from the cap 82-3 as illustrated in FIG. 27.

Figure 28:
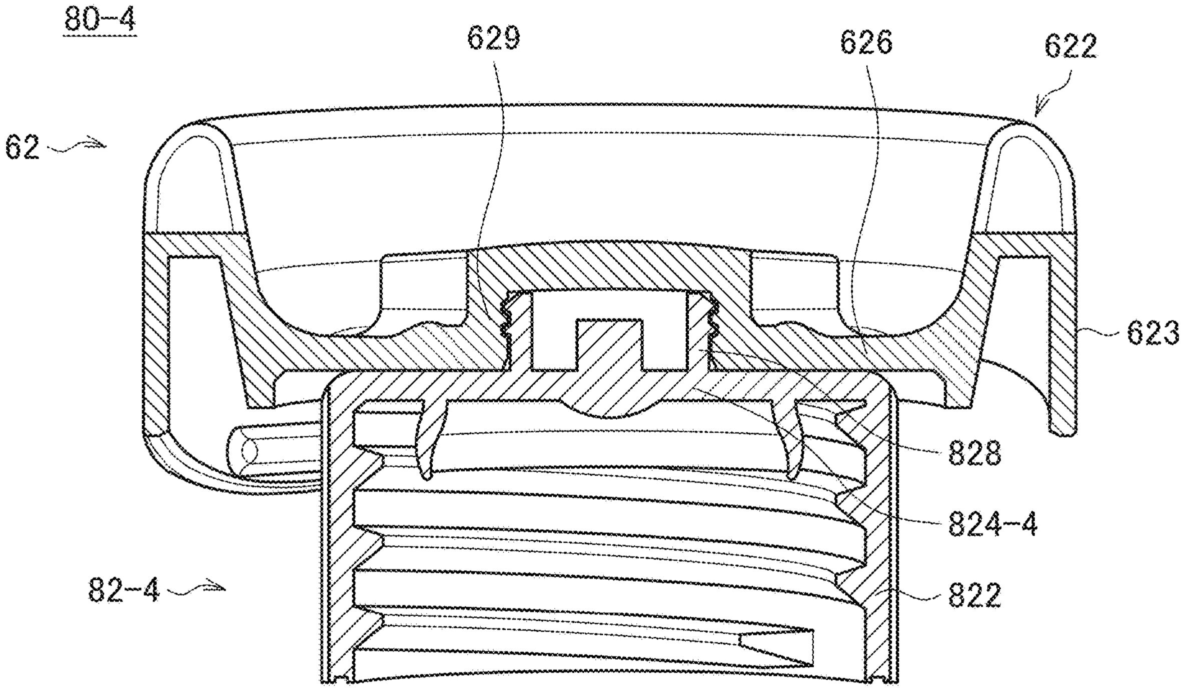
FIG. 28 is a cross-sectional view of a nozzle-attached cap 80-4 according to a fourth modification.

FIG. 28 is a cross-sectional view of a nozzle-attached cap 80-4 according to a fourth modification. As illustrated in FIG. 28, the nozzle-attached cap 80-4 includes a cap 82-4 and the nozzle 62. The cap 82-4 includes the spout engagement section 822 and a cap top surface section 824-4. The cap top surface section 824-4 has an upper surface provided with a nozzle engagement section 828 that is a tube having an outer circumference surface with a screw thread.

The nozzle 62 has the base section 626 provided with a recess section 629 that is recessed when viewed from below. The recess section 629 has a side wall provided with a screw thread. The nozzle 62 is attached to the cap 82-4 when the nozzle engagement section 828 of the cap 82-4 is screwed into the recess section 629. It is possible to separate the nozzle 62 from the cap 82-4 when the user twists the nozzle 62 off the cap 82-4.

(Movable Section)

The nozzle 62 may be provided with a movable section having pins, the movable section being pivotable between a position where the pins are inserted into the discharge outlets 628 of the nozzle 62 and a position where the pins are not inserted into the discharge outlets 628.

Figure 29:
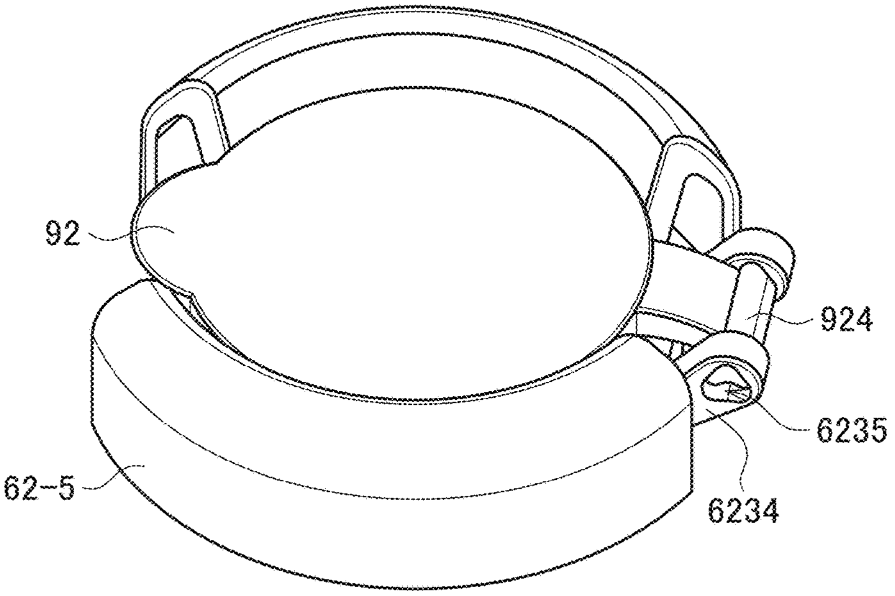
FIG. 29 is a perspective view of a nozzle 62-5 provided with a movable section 92.
Figure 30:
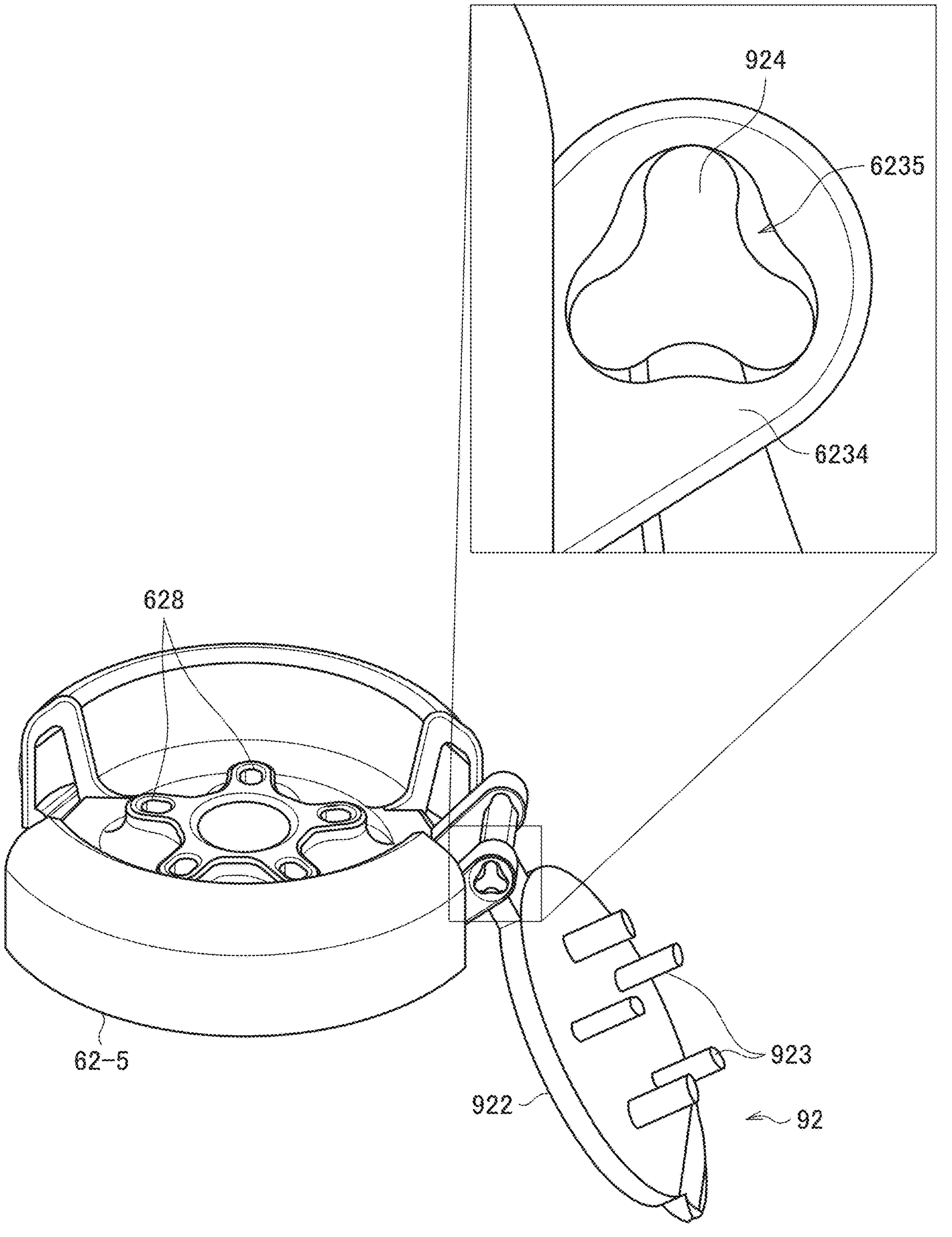
FIG. 30 is a perspective view of the nozzle 62-5 provided with the movable section 92.

FIG. 29 and FIG. 30 are perspective views of a nozzle 62-5 provided with a movable section 92. As illustrated in FIG. 29 and FIG. 30, the nozzle 62-5 includes a pair of movable-section engagement sections 6234 with a hole 6235. The movable section 92 includes a bolt 924 and a movable-section top surface 922 provided with a plurality of pins 923. The bolt 924 is inserted into the holes 6235 of the movable-section engagement sections 6234. This makes it possible to form a pivot axis that is orthogonal to the-up-down direction, and the movable section 92 is pivotable on the pivot axis with respect to the nozzle 62-5. FIG. 29 illustrates a state where the movable section 92 closes the nozzle62-5, and the pins 923 of the movable section 92 are inserted into the discharge outlets 628 of the nozzle 62-5. FIG. 20 illustrates a state where the movable section 92 opens the nozzle62-5, and the pins 923 of the movable section 92 are not inserted into the discharge outlets 628 of the nozzle 62-5.

As described above, it is possible to reduce a possibility for the discharge outlets 628 to get clogged with the fluid by inserting the pins 923 of the movable section 92 into the discharge outlets 628 of the nozzle 62-5 when the container 10 is not used.

Note that, as illustrated in FIG. 30, the bolt 924 has a substantially triangular cross-sectional shape with rounded edges, and the holes 6235 also have a substantially triangular shape with rounded edges. Such a configuration allows the movable section 92 to pivot on the pivot axis in units of 120 degrees. Accordingly, when using the container 10, it is possible to maintain a state where the movable section 92 opens the nozzle 62-5 in such a manner that an angle between the movable section 92 and the nozzle 62-5 is 120 degrees as illustrated in FIG. 30. Therefore, it is easy for the user to use the container 10.

<Details of Nozzle and Nozzle Attachment Section>

Here, details of the nozzle 62 and the nozzle attachment section 64 will be described. Note that, hereinafter, the bag container 20, the exterior container 30, the pump section 40, the shoulder section 50, and the nozzle attachment section 64 are treated as a container, and the container and the nozzle 62 constitute a single assembly. Note that, the nozzle 62 is an example of an attachment that is attachable/detachable to/from the container.

(Configuration)

As illustrated in FIG. 13, the nozzle attachment section 64 is an example of a tube section having the opening H2 that communicates with the storage space for the fluid. As illustrated in FIG. 12, the rib 645 formed on the outer circumference surface of the second region 644 of the nozzle attachment section 64 has a first surface **645*f* facing downward and a second surface 645*s* facing upward. An angle of the first surface 645*f* with respect to the up-down direction (direction along the Z axis illustrated in FIG. 1) is larger than an angle of the second surface 645*s*** with respect to the up-down direction.

In a similar way, as illustrated in FIG. 11, the rib 625 (protrusion) formed on the inner circumference surface of the outer ring section 623 of the nozzle 62 has a first surface **625*f* facing upward and a second surface 625*s* facing downward. An angle of the first surface 625*f* with respect to the up-down direction is larger than an angle of the second surface 625*s*** with respect to the up-down direction.

When the first surface **645*f* of the rib 645 abuts on the first surface 625*f* of the rib 625, the rib 645 functioning as a first engagement section becomes engageable with the rib 625 functioning as a second engagement section. The plurality of ribs 645 is provided along the circumferential direction of the nozzle attachment section 64. The plurality of ribs 625 is provided along the circumferential direction of the outer ring section 623. In addition, the length of the rib 625 in the circumferential direction of the outer ring section 623 is shorter than the length of the rib 645 in the circumferential direction of the nozzle attachment section 64**.

In addition, the first surface **625*f* of the rib 625 extends along the first rotation direction in such a manner that the first surface 625*f* gets biased upward as the first surface 625*f* goes toward the first rotation direction (direction of arrow illustrated in FIG. 33), the first rotation direction being one of circumferential directions of the outer ring section 623. In a similar way, the first surface 645*f* of the rib 645 extends along the first rotation direction in such a manner that the first surface 645*f* gets biased upward as the first surface 645*f*** goes toward the first rotation direction.

In addition, as indicated by the dashed rectangle in FIG. 12, the second region 644 of the nozzle attachment section 64 has curved portions protruding downward. The curved portion indicated by the dashed rectangle includes a first guide section 6427 that has a first surface **6427*f* facing upward. It can be said that, the first guide section 6427 is provided on a border between the first region 642 and the second region 644. Note that, along its circumferential direction, the nozzle attachment section 64 has a plurality of the curved portions protruding downward. Therefore, the nozzle attachment section 64 also includes a plurality of the first guide sections 6427 along its circumferential direction. In addition, the ribs 645 of the nozzle attachment section 64 are formed on the curved portions protruding downward in the second region 644**.

In a similar way, as indicated by the dashed rectangle in FIG. 11, the outer ring section 623 has a curved portion protruding downward. A second guide section 6237 is positioned on a lower end of the outer ring section 623 that serves as the curved portion indicated by the dashed rectangle. The second guide section 6237 has a first surface 6237*f* facing downward. Note that, along its circumferential direction, the outer ring section 623 has a plurality of the curved portions protruding downward. Therefore, the outer ring section 623 also includes a plurality of the second guide sections 6237 along its circumferential direction. In addition, the ribs 625 and the knob sections 6231 of the nozzle 62 are formed on the curved portions protruding downward of the outer ring section 623. The knob sections 6231 functions as antislip sections suppressing a slip of a finger in the circumferential direction.

At least one of the first surface 6427*f* of the first guide section 6427 or the first surface 6237*f* of the second guide section 6237 extends along the first rotation direction in such a manner that the first surface gets biased upward as the first surface goes toward the first rotation direction.

The ribs 625 of the nozzle 62 are provided in such a manner that the first surfaces 625*f* of the ribs 625 abut on the first surfaces 645*f* of the ribs 645 of the nozzle attachment section 64 or separates from the first surfaces 645*f* of the ribs 645 downward in a state where the first surfaces 6427*f* of the first guide sections 6427 abut on the first surfaces 6237*f* of the second guide sections 6237.

(Actions and Effects)

Figure 31:
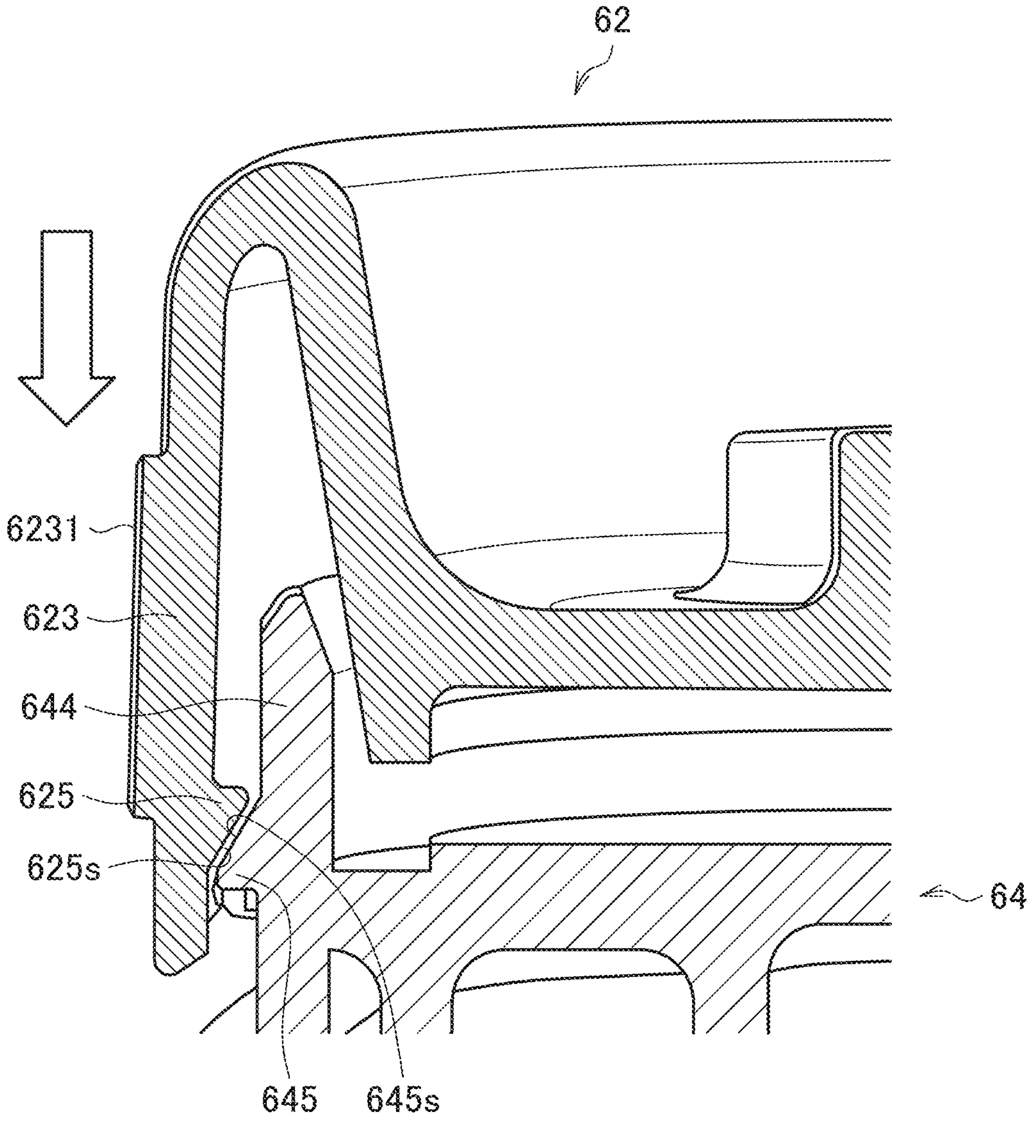
FIG. 31 is an explanatory diagram illustrating a situation where a rib 625 goes over a rib 645 downward.
Figure 32:
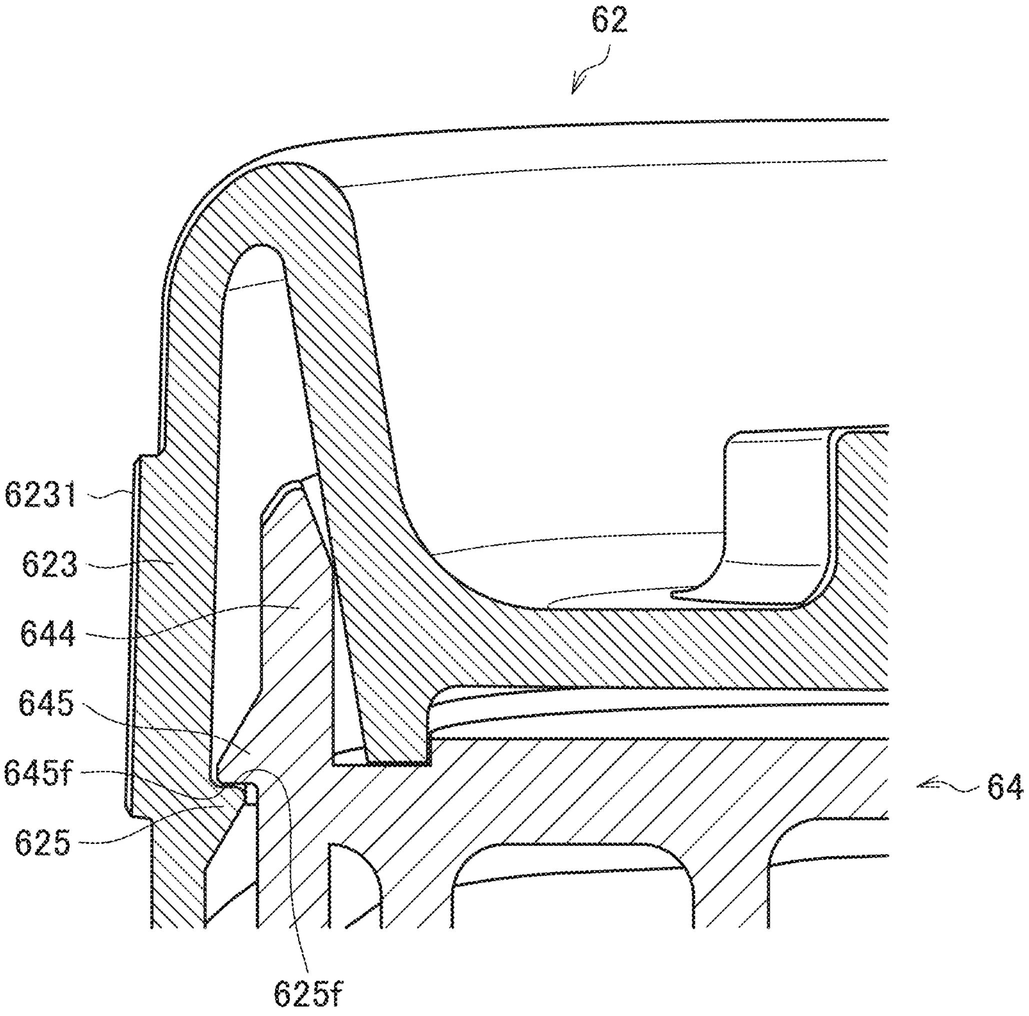
FIG. 32 is an explanatory diagram illustrating a state of engagement between the rib 625 and the rib 645.

The above-described configurations of the nozzle 62 and the nozzle attachment section 64 achieve various actions and effects. For example, an angle of the first surface 625*f* of the rib 625 of the nozzle 62 with respect to the up-down direction is larger than an angle of the second surface 625*s* with respect to the up-down direction. According to such a configuration, drag force for the rib 625 to go over the rib 645 upward from an engagement state illustrated in FIG. 32 is larger than drag force for the rib 625 to go over the rib 645 downward as illustrated in FIG. 31. Drag force is a force generated against an external force and acts in a direction that prevents the motion of an object caused by the external force. The above configuration allows the user to easily engage the nozzle 62 with the nozzle attachment section 64 by snapping the nozzle 62 into the nozzle attachment section 64. In addition, it is difficult to cancel the engagement when the rib 625 goes over the rib 645 upward. Therefore, it is possible to suppress damage to the rib 625 and the rib 645 caused by repeating the engagement and the cancellation by snaps. In addition, an angle of the first surface 645*f* of the rib 645 of the nozzle 64 with respect to the up-down direction is larger than an angle of the second surface 645*s* with respect to the up-down direction. Such a configuration achieves actions and effects that are similar to the above-described actions and effects.

In addition, the nozzle 62 and the nozzle attachment section 64 have the curved portions protruding downward. This makes it possible to guide the nozzle 62 in such a manner that the respective curved portions fit with each other when the user tries to engage the nozzle 62 with the nozzle attachment section 64 by snaps. Accordingly, it becomes easy to align the position of the nozzle 62 with the position of the nozzle attachment section 64, and it becomes easy to perform engaging operation.

In addition, at least one of the first surface 6427*f* of the first guide section 6427 or the first surface 6237*f* of the second guide section 6237 extends along the first rotation direction in such a manner that the first surface gets biased upward as the first surface goes toward the first rotation direction. According to such a configuration, when twisting the nozzle 62 off the nozzle attachment section 64 toward the first rotation direction to cancel the engagement between the rib 625 and the rib 645, the nozzle 62 is guided while the first surface 6237*f* of the second guide sections 6237 is abutting on the first surface 6427*f* of the first guide section 6427, and the nozzle 62 is lifted upward from the nozzle attachment section 64. This makes it easier to cancel the engagement by twisting the nozzle 62.

In addition, the first surface 645*f* of the rib 645 extends along the first rotation direction in such a manner that the first surface 645*f* gets biased upward as the first surface 645*f* goes toward the first rotation direction. According to such a configuration, when the nozzle 62 is guided while the first surface 6237*f* of the second guide sections 6237 of the nozzle 62 is abutting on the first surface 6427*f* of the first guide section 6427 of the nozzle attachment section 64, the nozzle 62 is guided in such a manner that the first surface 625*f* of the rib 625 goes along the first surface 645*f* of the rib 645 even if the nozzle 62 is lifted upward from the nozzle attachment section 64. This makes it possible to prevent the ribs 625 of the nozzle 62 from going over the ribs 645 of the nozzle attachment section 64 upward. Accordingly, it is possible to suppress damage to the ribs 625 and the ribs 645.

In addition, the first surface 625*f* of the rib 625 extends along the first rotation direction in such a manner that the first surface 625*f* gets biased upward as the first surface 625*f* goes toward the first rotation direction, the first rotation direction being one of the circumferential directions of the outer ring section 623. As described above, the shapes of the ribs 625 are similar to the shapes of the ribs 645. This makes it possible to improve strength of the engagement between the ribs 625 and the ribs 645.

In addition, the ribs 625 of the nozzle 62 are provided in such a manner that the first surfaces 625*f* of the ribs 625 abut on the first surfaces 645*f* of the ribs 645 of the nozzle attachment section 64 or separates from the first surfaces 645*f* of the ribs 645 downward in a state where the first surfaces 6427*f* of the first guide sections 6427 abut on the first surfaces 6237*f* of the second guide sections 6237. Specifically, the upward bias of at least one of the first surface 6427*f* of the first guide section 6427 or the first surface 6237*f* of the second guide section 6237 for a given amount of rotation in the first rotation direction is less than or equal to the upward bias of the first surface 645*f* of the rib 645 for the given amount of rotation in the first rotation direction. According to such a configuration, it becomes possible to prevent the ribs 625 of the nozzle 62 from going over the ribs 645 of the nozzle attachment section 64 upward more reliably. Note that, to improve the strength of the engagement between the ribs 625 and the ribs 645, the first surfaces 625*f* of the rib 625 preferably abut on the first surfaces 645*f* of the ribs 645 before canceling the engagement between the ribs 625 and the ribs 645 at least.

In addition, the length of the rib 625 in the circumferential direction of the outer ring section 623 is shorter than the length of the rib 645 in the circumferential direction of the nozzle attachment section 64. According to such a configuration, it is possible to lessen a power that is necessary for the user to engage the nozzle 62 with the nozzle attachment section 64 by snaps.

In addition, the plurality of ribs 625 and the plurality of ribs 645 are provided in the circumferential direction. According to such a configuration, it becomes possible to reduce the ranges of the single rib 625 and the single rib 645 in the circumferential direction. This makes it possible to reduce a relative amount of rotation of the nozzle 62 about the nozzle attachment section 64, the relative amount of rotation being necessary to cancel the engagement. In addition, the plurality of pairs of the rib 625 and the rib 645 is installed. This makes it possible to improve the strength of the engagement between the ribs 625 and the ribs 645 as the whole assembly. In view of the latter, the plurality of ribs 625 is preferably symmetrical about an axis line of the outer ring section 623, and the plurality of ribs 645 is preferably symmetrical about an axis line of the nozzle attachment section 64.

In addition, the plurality of curved portions of the nozzle 62 and the plurality of curved portions of the nozzle attachment section 64 are provided in the circumferential direction. This allows the user to easily find the curved portions of the nozzle 62 and the nozzle attachment section 64 regardless of postures of the nozzle 62 and the nozzle attachment section 64 viewed by the user. Accordingly, it becomes easier to align the position of the nozzle 62 with the position of the nozzle attachment section 64. From this viewpoint, the curved portions of the nozzle 62 are preferably provided on both sides across a plane passing through the axis line of the outer ring section 623, and the curved portions of the nozzle attachment section 64 are preferably provided on both sides across a plane passing through the axis line of the nozzle attachment section 64.

In addition, the plurality of first guide sections 6427 and the plurality of second guide sections 6237 are provided in the circumferential direction. This makes it possible to stabilize the guiding action obtained when the first guide sections 6427 abut on the second guide sections 6237, as the whole assembly. From this viewpoint, the plurality of first guide sections 6427 is preferably symmetrical about the axis line of the nozzle attachment section 64, and the plurality of second guide sections 6237 is preferably symmetrical about an axis line of the outer ring section 623.

In addition, the first guide sections 6427 are provided on the border between the first region 642 and the second region 644, and the second guide sections 6237 are provided on a lower end of the outer ring section 623. According to such a configuration, it becomes possible to easily suppress unevenness between the first region 642 of the nozzle attachment section 64 and the outer ring section 623 of the nozzle 62 in the assembly (for example, it becomes possible to form a continuous plane).

In addition, the ribs 645 are provided on the outer circumference surface of the second region 644 of the nozzle attachment section 64, and the ribs 625 are provided on the inner circumference surface of the outer ring section 623 of the nozzle 62. As described above, the ribs 625 and the ribs 645 are protruded from the surfaces. Such a configuration makes it possible to improve their durability because a region where the inner circumference surface of the outer ring section 623 slides on the outer circumference surface of the second region 644 when the engagement is made by snaps is substantially limited to the ribs 625 and the ribs 645.

In addition, the ribs 645 are formed on the curved portions protruding downward in the second region 644, and the ribs 625 are formed on the curved portions protruding downward in the outer ring section 623. In other words, the respective ribs are formed on portions having a relatively large area, and this makes it possible to improve degrees of freedom in the designs of the respective ribs.

In addition, the knob sections 6231 are formed on the curved portions protruding downward of the outer ring section 623. The knob sections 6231 functions as the antislip sections suppressing a slip of a finger in the circumferential direction. According to such a configuration, it becomes possible for the user to easily twist the nozzle 62 to cancel the engagement between the nozzle 62 and the nozzle attachment section 64.

<Supplement>

Although details of the preferable embodiments of the present invention have been described above with reference to the appended drawings, the technical scope of the present invention is not limited thereto. It will be clear to a person of ordinary skill in the art of the present invention that various modifications and improvements may be obtained within the scope of the technical idea recited by the scope of the appended claims, and it should be understood that they will naturally come under the technical scope of the present invention.

LIST OF ELEMENTS

10 container
20 bag container
22 bag main body
23 dip tube
24 spout section
242 tube section
243 screw section
244 protrusion section
245 recess section
246 upper flange
247 lower flange
248 joint section
30 exterior container
310 exterior member
32 trunk section
320 member trunk section
330 member top surface section
332 protrusion section
334 engagement section
336 fitting section
34 smaller-diameter section
340 member bottom section
342 hinge mechanism
35 rib
350 exterior member
360 member top surface section
362 semi-ring section
364 claw section
40 pump section
402 stem
404 housing
406 housing cap
408 piston
410 spring
412 ball valve
414 outer tube section
415 screw section
416 gasket
50 shoulder section
52 outer circumference section
53 rib

54 fitting section
55 hollow section
56 inner tube section
57 groove
58 bottom section
59 hole
60 discharge section
62 nozzle
622 ring-shaped section
623 outer ring section
6231 knob section
6232 protrusion section
6234 movable-section engagement section
6237 second guide section
**6237*f*** first surface
6235 hole
624 recess section
625 rib
**625*f*** first surface
**625*s*** second surface
626 base section
627 positioning rib
628 discharge outlet
629 recess section
64 nozzle attachment section
642 first region
6427 first guide section
**6427*f*** first surface
64 second region
645 rib
**645*f*** first surface
**645*s*** second surface
646 top surface section
6461 stem fitting section
647 positioning rib
70 overcap
80 nozzle-attached cap
82 cap
822 spout engagement section
824 cap top surface section
825 claw section
826 linear section
8261 head section
827 latch section
828 nozzle engagement section
87 coupler section
88 coupler section
92 movable section
922 movable section top surface
923 pin
924 bolt
H1 opening
H2 opening

The invention claimed is:

1. An assembly comprising:
an attachment; and
a container,
the container including a main body and a tube section,
the main body forming a storage space,
the tube section having an opening that communicates with the storage space,
the tube section having an outer circumference surface provided with a first engagement section,
the first engagement section having a first surface facing a first direction that is a direction toward the storage space,
the attachment including a ring-shaped section that is fittable with the tube section,
the ring-shaped section having an inner circumference surface provided with a second engagement section,
the second engagement section having a first surface facing a second direction that is a direction away from the storage space,
the first engagement section and the second engagement section being engageable with each other when the first surface of the first engagement section abuts on the first surface of the second engagement section, wherein
drag force in the second direction being larger than drag force in the first direction,
the drag force being force for the first engagement section or the second engagement section to go over each other,
the tube section including a first guide section and a curved portion protruding toward the first direction,
the first guide section having a first surface facing the second direction,
the ring-shaped section including a second guide section and a curved portion protruding toward the first direction,
the second guide section having a first surface facing the first direction,
the first surface of the first engagement section extending along a first rotation direction in such a manner that the first surface gets biased toward the second direction as the first surface goes toward the first rotation direction,
the first rotation direction being one of circumferential directions of the tube section,
at least one of the first surface of the first guide section or the first surface of the second guide section extending along the first rotation direction in such a manner that the first surface gets biased toward the second direction as the first surface goes toward the first rotation direction,
the first surface of the second engagement section being provided in such a manner that the first surface of the second engagement section abuts on the first surface of the first engagement section or separates from the first surface of the first engagement section toward the first direction in a state where the first surface of the first guide section abuts on the first surface of the second guide section.

2. The assembly according to claim 1, wherein
the first engagement section has a second surface facing the second direction, and
an angle of the first surface of the first engagement section with respect to the second direction is larger than an angle of the second surface of the first engagement section with respect to the first direction.

3. The assembly according to claim 1, wherein
the second engagement section has a second surface facing the first direction, and
an angle of the first surface of the second engagement section with respect to the first direction is larger than an angle of the second surface of the second engagement section with respect to the second direction.

4. The assembly according to claim 1,
wherein a length of the second engagement section in a circumferential direction of the ring-shaped section is shorter than a length of the first engagement section in the circumferential direction of the tube section.

5. The assembly according to claim 1, wherein
a plurality of the first engagement sections is provided in the circumferential direction of the tube section, and a plurality of the second engagement sections is provided in a circumferential direction of the ring-shaped section.

6. The assembly according to claim 1, wherein
a plurality of the first guide sections is provided in the circumferential direction of the tube section, and
a plurality of the second guide sections is provided in a circumferential direction of the ring-shaped section.

7. The assembly according to claim 1, wherein
the curved portion of the tube section includes the first guide section, and
the curved portion of the ring-shaped section includes the second guide section.

8. The assembly according to claim 1, wherein
the tube section has a first region and a second region positioned on the second direction side in comparison with the first region, the second region having a smaller outer diameter than the first region,
the ring-shaped section includes an outer ring section that overlaps with an outer circumference surface of the second region of the tube section in a radial direction,
the first guide section is provided on a border between the first region and the second region, and
the second guide section is provided on an end of the outer ring section in the first direction.

9. The assembly according to claim 8,
wherein the second region and the outer ring section have the curved portions.

10. The assembly according to claim 8, wherein
the first engagement section is a rib provided on the outer circumference surface of the second region, and
the second engagement section is a protrusion provided on the inner circumference surface of the outer ring section.

11. The assembly according to claim 10, wherein
the rib is formed on a portion protruding toward the second direction in the second region, and
the protrusion is formed on a portion protruding toward the first direction of the outer ring section.

12. The assembly according to claim 8, wherein
the second engagement section is a rib provided on the inner circumference surface of the outer ring section, and
the first surface of the second engagement section extends along the first rotation direction in such a manner that the first surface gets biased toward the second direction as the first surface goes toward the first rotation direction, the first rotation direction being one of circumferential directions of the ring-shaped section.

13. The assembly according to claim 8,
wherein, an anti-slip section is formed on a portion protruding toward the first direction of an outer circumference surface of the outer ring section, the anti-slip section suppressing a slip of a finger in the circumferential directions of the tube section.

14. The assembly according to claim 1, wherein
the container includes
a bag main body that stores fluid, and
an exterior container that stores the bag main body detachably, and
the tube section is provided on a member on an exterior container side.

15. The assembly according to claim 1,
wherein the attachment is a nozzle having a discharge outlet.

16. The assembly according to claim 15, wherein
the nozzle includes
the ring-shaped section, and
a base section that is positioned at an inner side than the ring-shaped section and on which the discharge outlet is provided, and
an edge of the ring-shaped section is positioned on the second direction side in comparison with the discharge outlet.

17. An attachment detachable from a container, the container including a main body and a tube section, the main body forming a storage space, the tube section having an opening that communicates with the storage space, the tube section having an outer circumference surface provided with a first engagement section, the first engagement section having a first surface facing a first direction that is a direction toward the storage space, the attachment comprising:
a ring-shaped section that is fittable with the tube section,
the ring-shaped section having an inner circumference surface provided with a second engagement section,
the second engagement section having a first surface facing a second direction that is a direction away from the storage space,
the first engagement section and the second engagement section being engageable with each other when the first surface of the first engagement section abuts on the first surface of the second engagement section,
drag force in the second direction being larger than drag force in the first direction,
the drag force being force for the first engagement section or the second engagement section to go over each other,
the tube section including a first guide section and a curved portion protruding toward the first direction,
the first guide section having a first surface facing the second direction,
the ring-shaped section including a second guide section and a curved portion protruding toward the first direction,
the second guide section having a first surface facing the first direction,
the first surface of the first engagement section extending along a first rotation direction in such a manner that the first surface gets biased toward the second direction as the first surface goes toward the first rotation direction,
the first rotation direction being one of circumferential directions of the tube section,
at least one of the first surface of the first guide section or the first surface of the second guide section extending along the first rotation direction in such a manner that the first surface gets biased toward the second direction as the first surface goes toward the first rotation direction,
the first surface of the second engagement section being provided in such a manner that the first surface of the second engagement section abuts on the first surface of the first engagement section or separates from the first surface of the first engagement section toward the first direction in a state where the first surface of the first guide section abuts on the first surface of the second guide section.

18. The attachment according to claim 17, wherein
the second engagement section has a second surface facing the first direction, and
an angle of the first surface of the second engagement section with respect to the first direction is larger than an angle of the second surface of the second engagement section with respect to the second direction.

19. A container detachable from an attachment comprising:

a main body and a tube section, the main body forming a storage space, the tube section having an opening that communicates with the storage space, the tube section having an outer circumference surface provided with a first engagement section, the first engagement section having a first surface facing a first direction that is a direction toward the storage space, the attachment including a ring-shaped section that is fittable with the tube section, the ring-shaped section having an inner circumference surface provided with a second engagement section, the second engagement section having a first surface facing a second direction that is a direction away from the storage space, the first engagement section and the second engagement section being engageable with each other when the first surface of the first engagement section abuts on the first surface of the second engagement section, drag force in the second direction being larger than drag force in the first direction, the drag force being force for the first engagement section or the second engagement section to go over each other, the tube section including a first guide section and a curved portion protruding toward the first direction, the first guide section having a first surface facing the second direction, the ring-shaped section including a second guide section and a curved portion protruding toward the first direction, the second guide section having a first surface facing the first direction, the first surface of the first engagement section extending along a first rotation direction in such a manner that the first surface gets biased toward the second direction as the first surface goes toward the first rotation direction, the first rotation direction being one of circumferential directions of the tube section, at least one of the first surface of the first guide section or the first surface of the second guide section extending along the first rotation direction in such a manner that the first surface gets biased toward the second direction as the first surface goes toward the first rotation direction, the first surface of the second engagement section being provided in such a manner that the first surface of the second engagement section abuts on the first surface of the first engagement section or separates from the first surface of the first engagement section toward the first direction in a state where the first surface of the first guide section abuts on the first surface of the second guide section.

20. The container according to claim 19, wherein the first engagement section has a second surface facing the second direction, and an angle of the first surface of the first engagement section with respect to the second direction is larger than an angle of the second surface of the first engagement section with respect to the first direction.

* * * * *